US012236347B2

(12) United States Patent
Wang et al.

(10) Patent No.: US 12,236,347 B2
(45) Date of Patent: Feb. 25, 2025

(54) MACHINE-LEARNING ARCHITECTURES FOR BROADCAST AND MULTICAST COMMUNICATIONS

(71) Applicant: Google LLC, Mountain View, CA (US)

(72) Inventors: Jibing Wang, San Jose, CA (US); Erik Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/401,096

(22) Filed: Dec. 29, 2023

(65) Prior Publication Data
US 2024/0135175 A1    Apr. 25, 2024

Related U.S. Application Data

(62) Division of application No. 16/698,804, filed on Nov. 27, 2019, now Pat. No. 11,886,991.

(51) Int. Cl.
*G06N 3/08*    (2023.01)
*G06N 3/04*    (2023.01)
(Continued)

(52) U.S. Cl.
CPC .............. *G06N 3/08* (2013.01); *G06N 3/04* (2013.01); *H04L 12/189* (2013.01); *H04L 25/0202* (2013.01)

(58) Field of Classification Search
None
See application file for complete search history.

(56) References Cited

U.S. PATENT DOCUMENTS 6,347,091 B1    2/2002  Wallentin et al.
10,157,293 B2  12/2018  Woss et al.
(Continued)

FOREIGN PATENT DOCUMENTS

CA    3046341 A1 *  6/2018  ............. H04H 20/42
CA    3102116 A1 * 12/2019  ......... G06F 16/2379
(Continued)

OTHER PUBLICATIONS

"Foreign Office Action", Chinese Application No. 202080081819.9, Mar. 27, 2024, 23 pages.
(Continued)

*Primary Examiner* — Ricky Chin
(74) *Attorney, Agent, or Firm* — Womble Bond Dickinson (US) LLP

(57) ABSTRACT

Techniques and apparatuses are described for machine-learning architectures for broadcast and multicast communications. A network entity processes broadcast or multicast communications using a deep neural network (DNN) to direct the one or more broadcast or multicast communications to a targeted group of user equipments (UEs) using the wireless communication system. The network entity receives feedback from at least one user equipment (UE) of the targeted group of UEs. The network entity determines a modification to the DNN based on the feedback. The network entity transmits an indication of the modification to the targeted group of UEs. The network entity updates the DNN with the modification to form a modified DNN. The network entity processes the broadcast or multicast communications using the modified DNN to direct the broadcast or multicast communications to the targeted group of UEs using the wireless communication system.

6 Claims, 18 Drawing Sheets

(51) Int. Cl.
*H04L 12/18* (2006.01)
*H04L 25/02* (2006.01)

(56) References Cited

U.S. PATENT DOCUMENTS

| | | | |
|---|---|---|---|
| 10,157,324 | B2 | 12/2018 | Aguera-Arcas |
| 10,354,201 | B1* | 7/2019 | Roy .................. G06N 20/00 |
| 10,375,585 | B2 | 8/2019 | Tan et al. |
| 10,461,421 | B1* | 10/2019 | Tran .................. H04W 24/02 |
| 2012/0054131 | A1 | 3/2012 | Williamson |
| 2015/0141027 | A1 | 5/2015 | Tsui et al. |
| 2016/0078339 | A1 | 3/2016 | Li et al. |
| 2016/0155050 | A1 | 6/2016 | Buibas et al. |
| 2016/0262167 | A1 | 9/2016 | Lan et al. |
| 2016/0328644 | A1 | 11/2016 | Lin et al. |
| 2017/0105210 | A1 | 4/2017 | Ueich et al. |
| 2017/0367036 | A1 | 12/2017 | Chen et al. |
| 2018/0034695 | A1 | 2/2018 | Balasubramanian et al. |
| 2018/0039884 | A1 | 2/2018 | Dalton et al. |
| 2018/0167778 | A1 | 6/2018 | Kodaypak |
| 2018/0307972 | A1 | 10/2018 | Feng et al. |
| 2018/0324888 | A1 | 11/2018 | Shi et al. |
| 2018/0349508 | A1 | 12/2018 | Bequet et al. |
| 2018/0367985 | A1 | 12/2018 | Thomas |
| 2019/0014488 | A1 | 1/2019 | Tan et al. |
| 2019/0044535 | A1 | 2/2019 | Ahmad |
| 2019/0087689 | A1 | 3/2019 | Chen |
| 2019/0132708 | A1* | 5/2019 | Belghoul ............ H04L 12/1845 |
| 2019/0138934 | A1 | 5/2019 | Prakash et al. |
| 2019/0171937 | A1 | 6/2019 | Lin et al. |
| 2019/0188285 | A1 | 6/2019 | Scheau et al. |
| 2019/0188553 | A1 | 6/2019 | Such et al. |
| 2019/0223073 | A1 | 7/2019 | Chen |
| 2019/0239238 | A1 | 8/2019 | Calabrese et al. |
| 2019/0268779 | A1 | 8/2019 | Peroulas et al. |
| 2019/0279082 | A1 | 9/2019 | Moloney et al. |
| 2019/0370636 | A1 | 12/2019 | Isopoussu |
| 2019/0372644 | A1 | 12/2019 | Chen et al. |
| 2019/0387372 | A1 | 12/2019 | Pedersen |
| 2019/0387448 | A1 | 12/2019 | Stauffer et al. |
| 2020/0053591 | A1 | 2/2020 | Prasad |
| 2020/0113017 | A1 | 4/2020 | Logothetis et al. |
| 2020/0229206 | A1 | 7/2020 | Badic et al. |
| 2020/0271743 | A1 | 8/2020 | Takeshima et al. |
| 2020/0272899 | A1 | 8/2020 | Dunne et al. |
| 2020/0364187 | A1 | 11/2020 | Tran |
| 2020/0366326 | A1 | 11/2020 | Jassal et al. |
| 2020/0366385 | A1 | 11/2020 | Ge et al. |
| 2020/0366537 | A1 | 11/2020 | Wang et al. |
| 2020/0382929 | A1 | 12/2020 | Shi et al. |
| 2021/0049451 | A1 | 2/2021 | Wang et al. |
| 2021/0064996 | A1 | 3/2021 | Wang et al. |
| 2021/0075691 | A1 | 3/2021 | Zeng et al. |
| 2021/0112425 | A1 | 4/2021 | Tran et al. |
| 2021/0158151 | A1* | 5/2021 | Wang .................. G06N 3/02 |
| 2021/0167875 | A1 | 6/2021 | Shen et al. |
| 2021/0182658 | A1 | 6/2021 | Wang et al. |
| 2021/0266125 | A1 | 8/2021 | Pezeshki et al. |
| 2021/0342687 | A1 | 11/2021 | Wang et al. |
| 2021/0345134 | A1* | 11/2021 | Ottersten ............ H04W 16/22 |
| 2021/0385682 | A1 | 12/2021 | Bedekar et al. |
| 2021/0390434 | A1* | 12/2021 | Bai .................. H04W 24/02 |
| 2021/0406677 | A1 | 12/2021 | Wang |
| 2022/0158894 | A1* | 5/2022 | Moulik ............ H04L 41/142 |
| 2023/0259789 | A1* | 8/2023 | Wang .................. G06N 3/045 |
| | | | 706/25 |

FOREIGN PATENT DOCUMENTS

| | | | | |
|---|---|---|---|---|
| CN | 107181600 | | 9/2017 | |
| CN | 115917509 | A * | 4/2023 | ........... G06F 18/214 |
| EP | 3418948 | | 12/2018 | |
| RU | 2010100877 | | 7/2011 | |
| WO | 2017091115 | | 6/2017 | |
| WO | 2018110985 | | 6/2018 | |
| WO | 2018149898 | | 8/2018 | |
| WO | 2018150083 | | 8/2018 | |
| WO | 20190116560 | | 4/2019 | |
| WO | 20190104280 | | 5/2019 | |
| WO | 2019116352 | | 6/2019 | |
| WO | 2019133049 | | 7/2019 | |
| WO | 2019137286 | | 7/2019 | |
| WO | 2019141902 | | 7/2019 | |
| WO | 2019211134 | | 11/2019 | |
| WO | 2020171803 | | 8/2020 | |
| WO | 2020229684 | | 11/2020 | |
| WO | 2021029889 | | 2/2021 | |
| WO | 2021029891 | | 2/2021 | |
| WO | 2021045748 | | 3/2021 | |
| WO | 20210863008 | | 5/2021 | |
| WO | 2021107831 | | 6/2021 | |
| WO | 2021118713 | | 6/2021 | |
| WO | 2021247254 | | 12/2021 | |
| WO | 2022005711 | | 1/2022 | |
| WO | 2022010685 | | 1/2022 | |

OTHER PUBLICATIONS

OPPO, CMCC, China Telecom, China Unicom, S1-193039, "Discussion on AI/ML Model Transfer in 5GS", Nov. 8, 2019, 13 pages [retrieved on Apr. 29, 2024] Retrieved from the Internet: <3GPP tsg_sa\wg1_serv,tsgs1_88_reno>.

Jiang et al., "Machine Learning Paradigms for Next-Generation Wireless Networks," Technical Report of Wireless Networking Group, Coordinated Science Laboratory, Dept. Electrical and Computer Engineering, University of Illinois, vol. 24., No. 2, Apr. 1, 2017, Apr. 1, 2017, 8 pages.

Klautau et al., "5G MIMO Data for Machine Learning: Application to Beam-Selection Using Deep Learning," 2018 Information Theory and Applications Workshop (ITA), Feb. 1, 2018, Feb. 1, 2018, 9 pages.

Yao et al., "Artificial Intelligence-Defined 5G Radio Access Networks," IEEE Communications Magazine, Mar. 2019, Mar. 2019, 7 pages.

"International Preliminary Report on Patentability," Application No. PCT/US2019/058328, May 3, 2022, 7 pages.

"Non-Final Office Action," U.S. Appl. No. 16/714,341, May 2, 2022, 12 pages.

"Notice of Allowance," U.S. Appl. No. 16/714,341, May 2, 2022, 12 pages.

Guo et al., "Exploiting Future Radio Resources with End-to-End Prediction by Deep Learning," Dec. 2018, 19 pages.

International Preliminary Report on Patentability, Application No. PCT/US2019/046535, Feb. 8, 2022, 10 pages.

International Preliminary Report on Patentability, Application No. PCT/US2019/046546 Feb. 8, 2022, 8 pages.

International Preliminary Report on Patentability, Application No. PCT/US2020/058487, Mar. 4, 2022, 16 pages.

International Preliminary Report on Patentability, Application No. PCT/US2019/049566 Mar. 8, 2022, 8 pages.

International Preliminary Report on Patentability, Application No. PCT/US2020/058557, Mar. 14, 2022, 8 pages.

International Search Report and Written Opinion, Application No. PCT/US2021/036497, Feb. 7, 2022, 18 pages.

Liu et al., "HierTrain: Fast Hierarchical Edge AI Learning with Hybrid Parallelism in Mobile-Edge-Cloud Computing," Mar. 22, 2020, 11 pages.

International Search Report and Written Opinion, Application No. PCT/US2021/033645, Sep. 16, 2021, 17 pages.

International Search Report and Written Opinion, Application No. PCT/US2021/0039408 012/012021, 11 pages.

Invitation to Pay Additional Fees, Application No. PCT/US2020/058487 Sep. 23, 2021, 4 pages.

Invitation to Pay Additional Fees, Application No. PCT/US2021/036497 Sep. 28, 2021, 11 pages.

Written Opinion, Application No. PCT/US2020/058557 Oct. 20, 2021, 7 pages.

Written Opinion, Application No. PCT/US2020/058487 Oct. 25, 2021, 14 pages.

(56) References Cited

OTHER PUBLICATIONS

Chen et al., "A Joint Learning and Communications Framework for Federated Learning Over Wireless Networks," IEEE Transactions on Wireless Communications Sep. 17, 2019, 30 pages.

Kang et al., "Neurosurgeon: Collaborative Intelligence Between the Cloud and Mobile Edge," ACM SIGARCH Computer Architecture News, Apr. 2017, 11 pages.

Khan et al., "Self Organizing Federated Learning Over Wireless Networks: A Socially Aware Clustering Approach," 2020 International Conference on Information Networking, Jan. 7, 2020, 6 pages.

Miyamoto et al., "AI-Assited Workflow Management Framework for Automated Closed-Lopp Operation," IEEE/IFIP Network Operations and Management Symposium, Apr. 2018, 6 pages.

Nishio et al., "Client Selection for Federated Learning with Heterogeneous Resources in Mobile Edge," IEEE International Conference Communiations, May 20, 2019, 11 pages.

Sun et al., "Adaptive Federated Learning with Gradient Compression in Uplink NOMA," Cornell University Library, Mar. 3, 2020, 10 pages.

Wang et al., "Convergence of Edge Computing and Deep Learning: A Comprehensive Survey," IEEE Communications Surveys & Tutorials PP (99): 1-1, Jan. 2020, 36 pages.

"Architectrural Framework for Machine Learning in Future Networks Including IMT-2020," Draft new Recommendation ITU-T Y.IMT2020-ML-Arch, Apr. 30, 2019, 28 pages.

"Discussion on AI/ML Model Transfer in 5GS", 3GGP SA WG1 #88, Nov. 2019, 13 pages.

International Search Report and Written Opinion, Application No. PCT/US2020/058487, Mar. 9, 2021, 22 pages.

International Search Report and Written Opinion, Application No. PCT/US2020/058557, Apr. 29, 2021, 13 pages.

Invitation to Pay Additional Fees and Partial Search Report, Application No. PCT/US2020/058487, Jan. 29, 2021, 11 pages.

Chen et al, "Deep Learning with Edge Computing: A Review," Aug. 2019, 21 pages.

Dorner et al., "Deep Learning-Based Communication Over the Air," Jul. 11, 2017, 11 pages.

Ferrus et al., "Applicability Domains of Machine Learning in Next Generation Radio Access Networks," Dec. 2019, 9 pages.

Mismar et al., "Deep Learning in Downlink Coordinated Multipoint in New Radio Heterogeneous Networks," Mar. 14, 2019, 4 pages.

Samarakoon, "Federated Learning for Ultra-Reliable Low-Latency V2V Communications," Dec. 9, 2018, 7 pages.

Ye et al., "Deep Learning Based end-to-end Wireless Communication Systems Without Pilots," Feb. 23, 2021, 13 pages.

International Search Report and Written Opinion, Application No. PCT/US2019/058328, Jul. 21, 2020, 12 pages.

Dahlman et al., "Carrier Aggregation," Retrieved at: https://www.sciencedirect.com/topics/engineering/carrier-aggregation - on Sep. 17, 2020, 2016, 14 pages.

Raghu et al., "Deep Reinforcement Learning Based Power Control for Wireless Multicast Systems," Oct. 24, 2019, 9 pages.

Silver, "3 Ways Nokia is Using Maching Learning in 5G Networks," Retrieved at: https://spectrum.ieee.org/tech-talk/telecom/wireless/3-ways-nokia-is-using-machine-learning-in-5g-networks, Jun. 25, 2018, 3 pages.

Sun et al., "Application of Machine Learning in Wireless Networks: Key Techniques and Open Issues," Accessed online at: https://arxiv.org/pdf/1809.08707.pdf on Jul. 22, 20, Mar. 1, 2019, 34 pages.

Tuban et al, "Genetic Algorithm Approach for Dynamic Configuration of Multicast Broadcast Single Frequency Network Deployment in LTE" Nov. 2011, 5 pages.

Xu et al., "Energy-Efficient Chance-Constrained Resource Allocation for Multicast Cognitive OFDM Network," May 2016, 8 pages.

"3rd Generation Partnership Project: Technical Specification Group Services and System Aspects: Study on application architecture for enabling Edge Applications; (Release 17)," 3GPP TR 23.758 V17.0.0 (Dec. 2019), Dec. 2019, 113 pages.

Foreign Office Action, European Application No. 19805861.2, Jul. 9, 2020, 7 pages.

International Search Report and Written Opinion, PCT Application No. PCT/US2019/059094, Feb. 17, 2020, 16 pages.

International Search Report and Written Opinion, PCT Application No. PCT/US2019/046546, Apr. 9, 2020, 13 pages.

International Search Report and Written Opinion, PCT Application No. PCT/US2019/046535, May 20, 2020, 17 pages.

International Search Report and Written Opinion, PCT Application No. PCT/US2019/049566, May 26, 2020, 13 pages.

Bonawitz et al., "Towards Federated Learning at Scale: System Design," Proceedings of the 2nd SysML Conference, Palo Alto, CA, USA, 2019, 15 pages.

Huang et al., "Deep Learning for Physical-Layer 5G Wireless Techniques: Opportunities, Challenges and Solutions," Apr. 23, 2019, 18 pages.

\* cited by examiner

MACHINE-LEARNING ARCHITECTURES FOR BROADCAST AND MULTICAST COMMUNICATIONS

CROSS REFERENCE TO RELATED APPLICATIONS

This application is a divisional application of U.S. application Ser. No. 16/698,804, entitled "MACHINE-LEARNING ARCHITECTURES FOR BROADCAST AND MULTICAST COMMUNICATIONS" and filed on Nov. 27, 2019, which is expressly incorporated by reference herein in its entirety.

BACKGROUND

The evolution of wireless communication systems oftentimes stems from a demand for data throughput. As one example, the demand for data increases as more and more devices gain access to wireless communication systems. Evolving devices also execute data-intensive applications that utilize more data than traditional applications, such as data-intensive streaming-video applications, data-intensive social media applications, data-intensive audio services, etc. Thus, to accommodate increased data usage, evolving wireless communication systems utilize increasingly complex architectures to provide more data throughput relative to legacy wireless communication systems.

As one example, fifth generation (5G) standards and technologies transmit data using higher frequency bands, such as the above-6 Gigahertz (GHz) band (e.g., 5G millimeter wave (mmW) technologies) to increase data capacity. However, transmitting and recovering information using these higher frequency ranges poses challenges. To illustrate, higher frequency signals are more susceptible to multipath fading, scattering, atmospheric absorption, diffraction, interference, and so forth, relative to lower-frequency signals. These signal distortions oftentimes lead to errors when recovering the information at a receiver. As another example, hardware capable of transmitting, receiving, routing, and/or otherwise using these higher frequencies can be complex and expensive, which increases the processing costs in a wirelessly-networked device.

SUMMARY

This document describes techniques and apparatuses for machine-learning architectures for broadcast and multicast communications. In implementations, a network entity determines a configuration of a deep neural network (DNN) for processing broadcast or multicast communications transmitted over a wireless communication system, where the communications are directed to a targeted group of user equipments (UEs). The network entity forms a network-entity DNN based on the determined configuration of the DNN and processes the broadcast or multicast communications using the network-entity DNN. In implementations, the network entity forms a common DNN to process and/or propagate the broadcast or multicast communications to the targeted group of UEs.

The details of one or more implementations of machine-learning architectures for broadcast and multicast communications are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of machine-learning architectures for broadcast and multicast communications are described below. The use of the same reference numbers in different instances in the description and the figures indicate similar elements.

DETAILED DESCRIPTION

Figure 1:
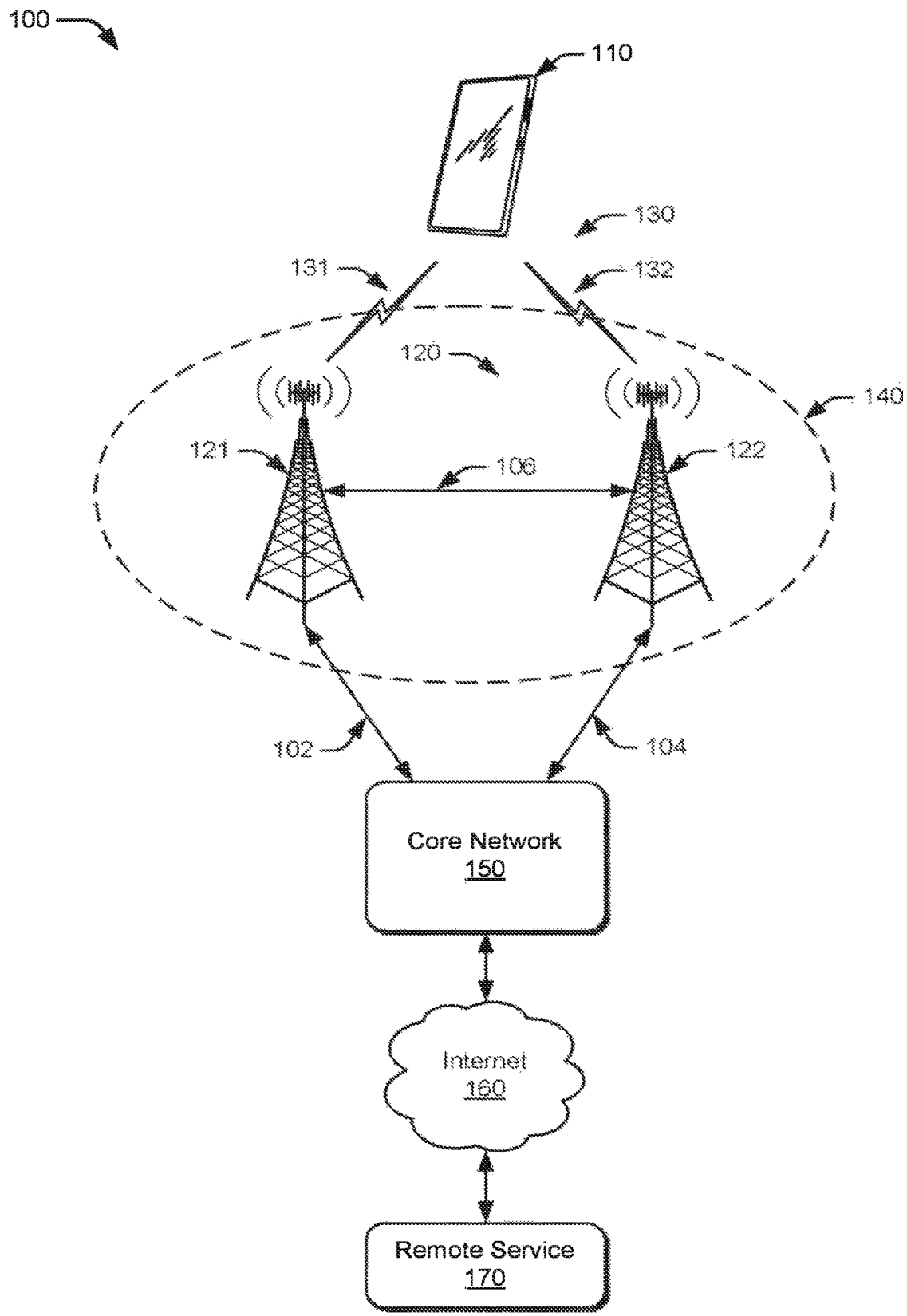
FIG. 1 illustrates an example environment in which various aspects of machine-learning architectures for broadcast and multicast communications can be implemented.

In conventional wireless communication systems, transmitter and receiver processing chains include complex functionality. For instance, a channel estimation block in the processing chain estimates or predicts how a signal distorts while propagating through a transmission environment. As another example, channel equalizer blocks reverse the signal distortions identified by the channel estimation block. These complex functions oftentimes become more complicated when processing higher frequency ranges, such as 5G mmW signals that are at or around the 6 GHz band.

DNNs provide alternative solutions to complex processing, such as the complex functionality used in a wireless communication system. By training a DNN on transmitter and/or receiver processing chain operations, the DNN can replace conventional functionality in a variety of ways, such as by replacing some or all of the conventional processing blocks used to process broadcast or multicast communication signals, replacing individual processing chain blocks, etc. Dynamic reconfiguration of a DNN, such as by modifying various parameter configurations (e.g., coefficients, layer connections, kernel sizes) also provides an ability to adapt to changing operating conditions.

This document describes aspects of machine-learning architectures for broadcast and multicast communications. In implementations, a network entity associated with a wireless communication system determines a configuration of a deep neural network (DNN) for processing broadcast or multicast communications transmitted over a wireless communication system to a targeted group of UEs. In some implementations, the network entity, such as a core network server or a base station (BS), determines the configuration based on various characteristics associated with the targeted group of UEs, such as an estimated location or UE capabilities. The network entity forms a network-entity DNN based on the determined configuration of the DNN and processes the broadcast or multicast communications using the network-entity DNN to transmit the broadcast or multicast communications over the wireless communication system and directed to the targeted group of UEs.

One or more aspects of machine-learning architectures for broadcast and multicast communications include processing broadcast or multicast communications using a DNN to direct the broadcast or multicast communications to a targeted group of UEs over a wireless communication system. In implementations, a network entity receives feedback from at least one UE of the targeted group of UEs and determines a modification to the DNN based on the feedback. The network entity then transmits an indication of the modification to the targeted group of UEs. Alternately or additionally, the network entity updates the DNN with the modification to form a modified DNN and processes the broadcast or multicast communications using the modified DNN to transmit the broadcast or multicast communications over the wireless communication system and directed to the targeted group of UEs.

Processing broadcast and multicast communications using DNN(s) allows various devices operating in the wireless communication system to correct for changes in a current operating condition, such as location changes of a targeted UE. By monitoring the changes, such as through metrics or feedback from a UE, the DNN(s) can be adjusted to correct or address the changes. Alternately or additionally, the DNN(s) can be modified based upon capabilities of the targeted UEs. These modifications improve an overall performance (e.g., lower bit errors, improved signal quality, improved latency) of how the broadcast and multicast communications are transmitted and/or recovered. As another example, DNNs can be trained to process complex input that corresponds to a complex environment, such a complex environment that includes a targeted group of UEs, where each UE has different processing powers and/or estimated locations. Accordingly, DNNs provide a flexible and modifiable solution to complex processing.

The phrases "transmitted over," "communications exchanged," and "communications associated with" include generating communications to be transmitted over the wireless communication system (e.g. processing pre-transmission communications) and/or processing communications received over the wireless communication system. Thus, "processing communications transmitted over the wireless communication system," "communications exchanged over the wireless communication system," as well as "communications associated with the wireless communication system" include generating the transmissions (e.g., pre-transmission processing), processing received transmissions, or any combination thereof.

Example Environment

FIG. 1 illustrates an example environment 100 which includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170. The remote service 170 represents the computing, communication, and storage devices used to provide any of a multitude of services including interactive voice or video communication, file transfer, streaming voice or video, and other technical services implemented in any manner such as voice calls, video calls, website access, messaging services (e.g., text messaging or multi-media messaging), photo file transfer, enterprise software applications, social media applications, video gaming, streaming video services, and podcasts.

Example Devices

Figure 2:
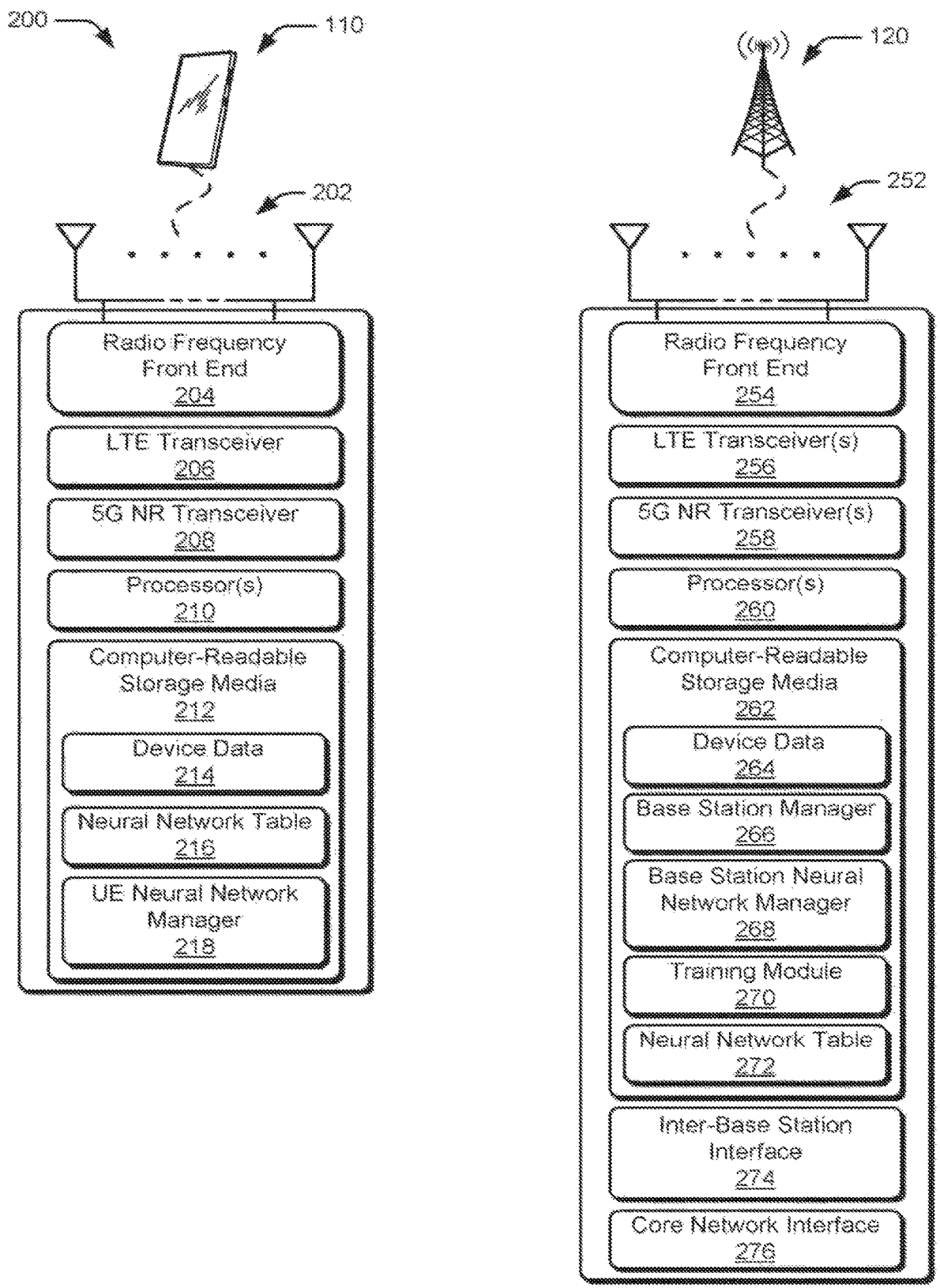
FIG. 2 illustrates an example device diagram of devices that can implement various aspects of machine-learning architectures for broadcast and multicast communications.
Figure 3:
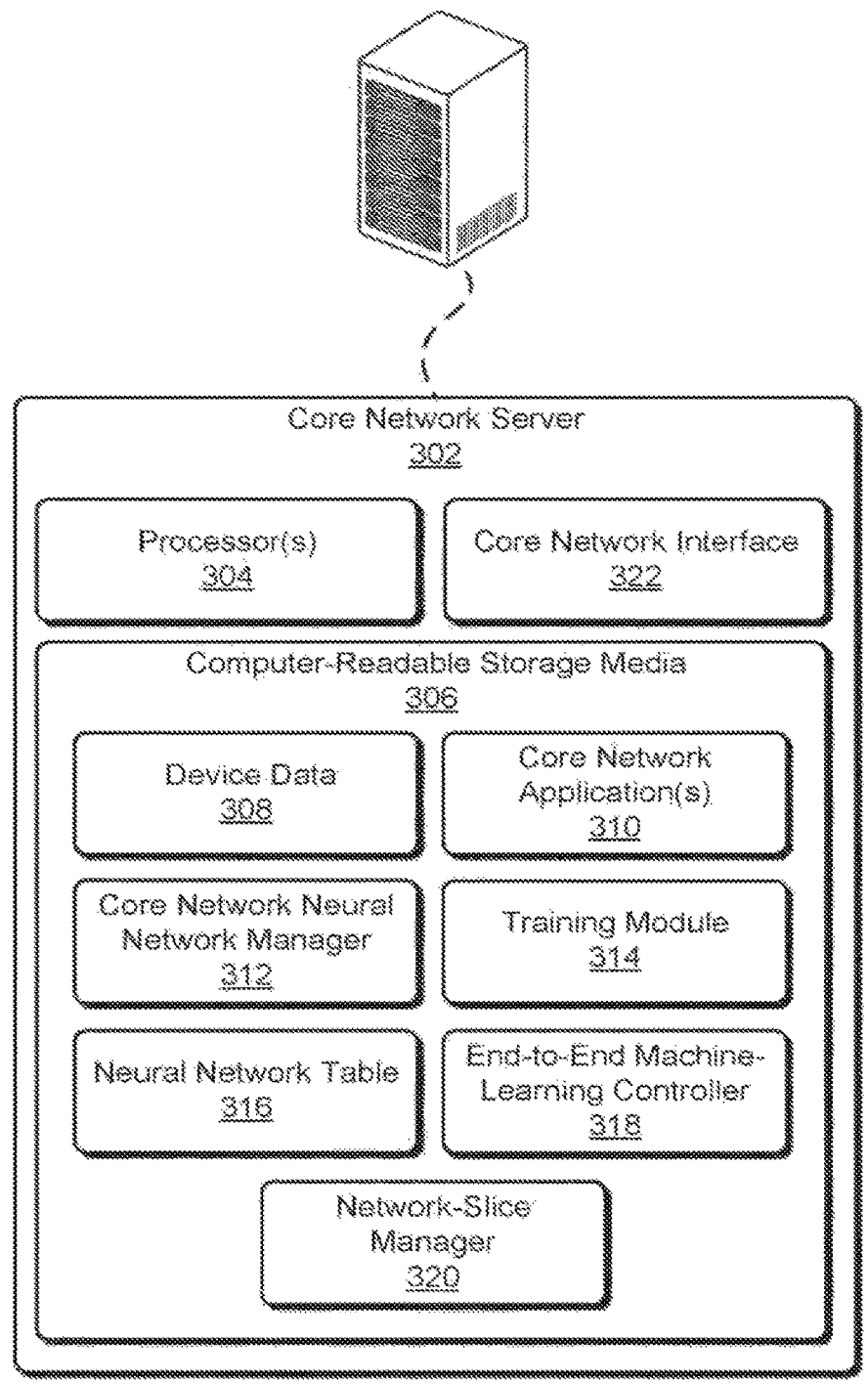
FIG. 3 illustrates an example device diagram of a device that can implement various aspects of machine-learning architectures for broadcast and multicast communications.

FIG. 2 illustrates an example device diagram 200 of the user equipment 110 and one of the base stations 120. FIG. 3 illustrates an example device diagram 300 of a core network server 302. The user equipment 110, the base station 120, and/or the core network server 302 may include additional functions and interfaces that are omitted from FIG. 2 or FIG. 3 for the sake of clarity.

The user equipment 110 includes antennas 202, a radio frequency front end 204 (RF front end 204), a wireless transceiver (e.g., an LTE transceiver 206, and/or a 5G NR transceiver 208) for communicating with the base station 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, neural network tables, and/or an operating system of the user equipment 110, which are executable by processor(s) 210 to enable user-plane communication, control-plane signaling, and user interaction with the user equipment 110.

In some implementations, the computer-readable storage media 212 includes a neural network table 216 that stores various architecture and/or parameter configurations that form a neural network, such as, by way of example and not of limitation, parameters that specify a fully-connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of NN formation configuration elements (e.g., architecture and/or parameter configurations) that can be used to create a NN formation configuration (e.g., a combination of one or more NN formation configuration elements) that defines and/or forms a DNN. In some implementations, a single index value of the neural network table 216 maps to a single NN formation configuration element (e.g., a 1:1 correspondence). Alternately or additionally, a single index value of the neural network table 216 maps to a NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

In some implementations, the CRM 212 may also include a user equipment neural network manager 218 (UE neural network manager 218). Alternately or additionally, the UE neural network manager 218 may be implemented in whole or part as hardware logic or circuitry integrated with or separate from other components of the user equipment 110. The UE neural network manager 218 accesses the neural network table 216, such as by way of an index value, and forms a DNN using the NN formation configuration elements specified by a NN formation configuration. In implementations, UE neural network manager forms multiple DNNs to process wireless communications (e.g., downlink communications and/or uplink communications exchanged with the base station 120).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 include antennas 252, a radio frequency front end 254 (RF front end 254), one or more wireless transceivers (e.g. one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-Multiple-In, Multiple Out (Massive-MIMO), for the transmission and reception of communications with the UE 110.

The base station 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the user equipment 110, as well as communication with a core network, such as the core network 150.

CRM 262 also includes a base station neural network manager 268 (BS neural network manager 268). Alternately or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements. In some implementations, the BS neural network manager receives feedback from the UE 110, and selects the neural network formation configuration based on the feedback. Alternately or additionally, the BS neural network manager 268 receives neural network formation configuration directions from core network 150 elements through a core network interface 276 or an inter-base station interface 274 and forwards the neural network formation configuration directions to UE 110.

CRM 262 includes training module 270 and neural network table 272. In implementations, the base station 120 manage and deploy NN formation configurations to UE 110. Alternately or additionally, the base station 120 maintain the neural network table 272. The training module 270 teaches and/or trains DNNs using known input data. For instance, the training module 270 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications). This includes training the DNN(s) offline (e.g., while the DNN is not actively engaged in processing the communications) and/or online (e.g., while the DNN is actively engaged in processing the communications).

In implementations, the training module 270 extracts learned parameter configurations from the DNN to identify the NN formation configuration elements and/or NN formation configuration, and then adds and/or updates the NN formation configuration elements and/or NN formation configuration in the neural network table 272. The extracted parameter configurations include any combination of information that defines the behavior of a neural network, such as node connections, coefficients, active layers, weights, biases, pooling, etc.

The neural network table 272 stores multiple different NN formation configuration elements and/or NN formation configurations generated using the training module 270. In some implementations, the neural network table includes input characteristics for each NN formation configuration element and/or NN formation configuration, where the input characteristics describe properties about the training data used to generate the NN formation configuration element and/or NN formation configuration. For instance, the input characteristics includes, by way of example and not of limitation, power information, signal-to-interference-plus-noise ratio (SINR) information, channel quality indicator (CQI) information, channel state information (CSI), Doppler feedback, frequency bands, BLock Error Rate (BLER), Quality of Service (QoS), Hybrid Automatic Repeat reQuest (HARD) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, base station capabilities (BS capabilities), power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 272 maps to a single NN formation configuration element (e.g., a 1:1 correspondence). Alternately or additionally, a single index value of the neural network table 272 maps to a NN formation configuration (e.g., a combination of NN formation configuration elements).

In implementations, the base station 120 synchronizes the neural network table 272 with the neural network table 216 such that the NN formation configuration elements and/or input characteristics stored in one neural network table is replicated in the second neural network table. Alternately or additionally, the base station 120 synchronizes the neural network table 272 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

The base station 120 also include an inter-base station interface 274, such as an Xn and/or X2 interface, which the base station manager 266 configures to exchange user-plane, control-plane, and other information between other base station 120, to manage the communication of the base station 120 with the user equipment 110. The base station 120 include a core network interface 276 that the base station manager 266 configures to exchange user-plane, control-plane, and other information with core network functions and/or entities.

In FIG. 3, the core network server 302 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 302 may provide the all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and so forth. The core network server 302 is illustrated as being embodied on a single server that includes processor(s) 304 and computer-readable storage media 306 (CRM 306). The processor 304 may be a single core processor or a multiple core processor composed of a variety of materials, such as silicon, polysilicon, high-K dielectric, copper, and so on. CRM 306 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 308 of the core network server 302. The device data 308 includes data to support a core network function or entity, and/or an operating system of the core network server 302, which are executable by processor(s) 304.

CRM 306 also includes one or more core network applications 310, which, in one implementation, is embodied on CRM 306 (as shown). The one or more core network applications 310 may implement the functionality such as UPF, AMF, S-GW, P-GW, MME, ePDG, and so forth. Alternately or additionally, the one or more core network applications 310 may be implemented in whole or part as hardware logic or circuitry integrated with or separate from other components of the core network server 302.

CRM 306 also includes a core network neural network manager 312 that manages NN formation configurations used to process communications exchanged between UE 110 and the base stations 120. In some implementations, the core network neural network manager 312 analyzes various parameters, such as current signal channel conditions (e.g., as reported by base stations 120, as reported by other wireless access points, as reported by UEs 110 (via base stations or other wireless access points)), capabilities at base stations 120 (e.g., antenna configurations, cell configurations, Multiple-In, Multiple-Out (MIMO), capabilities, radio capabilities, processing capabilities), capabilities of UE 110 (e.g., antenna configurations, MIMO capabilities, radio capabilities, processing capabilities), and so forth. For example, the base stations 120 obtain the various parameters during the communications with the UE and forward the parameters to the core network neural network manager 312. The core network neural network manager selects, based on these parameters, a NN formation configuration that improves the accuracy of a DNN processing the communications. Improving the accuracy signifies an improved accuracy in the output, such as lower bit errors, generated by the neural network relative to a neural network configured with another NN formation configuration. The core network neural network manager 312 then communicates the selected NN formation configuration to the base stations 120 and/or the UE 110. In implementations, the core network neural network manager 312 receives UE and/or BS feedback from the base station 120 and selects an updated NN formation configuration based on the feedback.

CRM 306 includes training module 314 and neural network table 316. In implementations, the core network server 302 manages and deploys NN formation configurations to multiple devices in a wireless communication system, such as UEs 110 and base stations 120. Alternately or additionally, the core network server maintains the neural network table 316 outside of the CRM 306. The training module 314 teaches and/or trains DNNs using known input data. For instance, the training module 314 trains DNN(s) to process different types of pilot communications transmitted over a wireless communication system. This includes training the DNN(s) offline and/or online. In implementations, the training module 314 extracts a learned NN formation configuration and/or learned NN formation configuration elements from the DNN and stores the learned NN formation configuration elements in the neural network table 316. Thus, a NN formation configuration includes any combination of architecture configurations (e.g., node connections, layer connections) and/or parameter configurations (e.g., weights, biases, pooling) that define or influence the behavior of a DNN. In some implementations, a single index value of the neural network table 316 maps to a single NN formation configuration element (e.g., a 1:1 correspondence). Alternately or additionally, a single index value of the neural network table 316 maps to a NN formation configuration (e.g., a combination of NN formation configuration elements).

In some implementations, the training module 314 of the core network neural network manager 312 generates complementary NN formation configurations and/or NN formation configuration elements to those stored in the neural network table 216 at the UE 110 and/or the neural network table 272 at the base station 121. As one example, the training module 314 generates neural network table 316 with NN formation configurations and/or NN formation configuration elements that have a high variation in the architecture and/or parameter configurations relative to medium and/or low variations used to generate the neural network table 272 and/or the neural network table 216. For instance, the NN formation configurations and/or NN formation configuration elements generated by the training module 314 correspond to fully-connected layers, a full kernel size, frequent sampling and/or pooling, high weighting accuracy, and so forth. Accordingly, the neural network table 316 includes, at times, high accuracy neural networks at the trade-off of increased processing complexity and/or time.

The NN formation configurations and/or NN formation configuration elements generated by the training module 270 have, at times, more fixed architecture and/or parameter configurations (e.g., fixed connection layers, fixed kernel size, etc.), and less variation, relative to those generated by the training module 314. The training module 270, for example, generates streamlined NN formation configurations (e.g., faster computation times, less data processing), relative to those generated by the training module 314, to optimize or improve a performance of end2end network communications at the base station 121 and/or the UE 110. Alternately or additionally, the NN formation configurations and/or NN formation configuration elements stored at the neural network table 216 at the UE 110 include more fixed architecture and/or parameter configurations, relative to those stored in the neural network table 316 and/or the neural network table 272, that reduce requirements (e.g., computation speed, less data processing points, less computations, less power consumption, etc.) at the UE 110 relative to the base station 121 and/or the core network server 302. In implementations, the variations in fixed (or flexible) architecture and/or parameter configurations at each neural network are based on the processing resources (e.g., processing capabilities, memory constraints, quantization constraints (e.g., 8-bit vs. 16-bit), fixed-point vs. floating point computations, floating point operations per second (FLOPS), power availability) of the devices targeted to form the corresponding DNNs. Thus, UEs or access points with less processing resources relative to a core network server or base station receive NN formation configurations optimized for the available processing resources.

The neural network table 316 stores multiple different NN formation configuration elements generated using the training module 314. In some implementations, the neural network table includes input characteristics for each NN formation configuration element and/or NN formation configuration, where the input characteristics describe properties about the training data used to generate the NN formation configuration. For instance, the input characteristics can include power information, SINR information, CQI, CSI, Doppler feedback, RSS, error metrics, minimum end-to-end (E2E) latency, desired E2E latency, E2E QoS, E2E throughput, E2E packet loss ratio, cost of service, etc.

CRM 306 also includes an end-to-end machine-learning controller 318 (E2E ML controller 318). The E2E ML controller 318 determines an end-to-end machine-learning configuration (E2E ML configuration) for processing information exchanged through an E2E communication, such as a QoS flow. In implementations, the E2E ML controller analyzes any combination of ML capabilities (e.g., supported ML architectures, supported number of layers, available processing power, memory limitations, available power budget, fixed-point processing vs. floating point processing, maximum kernel size capability, computation capability) of devices participating in the E2E communication. Alternately or additionally, the E2E ML controller analyzes any combination of QoS requirements, QoS parameters, and/or QoS characteristics to determine an E2E ML configuration that satisfies the associated requirements, parameters, and/or characteristics. In some implementations, the E2E ML controller obtains metrics that characterize a current operating environment and analyzes the current operating environment to determine the E2E ML configuration. This includes determining an E2E ML configuration that includes an architecture configuration in combination with parameter configuration(s) that define a DNN or determining an E2E ML configuration that simply includes parameter configurations used to update the DNN.

In determining the E2E ML configuration, the E2E ML controller sometimes determines a partitioned E2E ML configuration that distributes the processing functionality associated with the E2E ML configuration across multiple devices. For clarity, FIG. 3 illustrates the end-to-end machine-learning controller 318 as separate from the core network neural network manager 312, but in alternate or additional implementations, the core network neural network manager 312 includes functionality performed by the end-to-end machine-learning controller 318 or vice versa. Further, while FIG. 3 illustrates the core network server 302 implementing the E2E ML controller 318, alternate or additional devices can implement the E2E ML controller, such as the base station 120 and/or other network elements.

The core network server 302 also includes a network-slice manager 320. Generally speaking, the network-slice manager 190 uses network slicing to provide different quality-of-service flows through the wireless communication network (e.g., provide different quality-of-service flows between at least one UE 110, at least one base station 120, and the core network 150). At times, the network-slice manager 320 works in conjunction with the E2E ML controller 318 to partition network resources to provide communication exchanges that meet or exceed a quality-of-service level. For example, the quality-of-service level can be specified through one or more quality-of-service parameters, such as latency, throughput (e.g., bandwidth or data rate), reliability, or an error rate (e.g., a bit error rate). Other example quality-of-service parameters include availability, packet loss, or jitter. In addition to the quality-of-service level, the network slice can also provide a particular level of security through cryptography. In some implementations, the network-slice manager 320 associates each network slice with one or more end-to-end machine-learning architectures to provide the quality-of-service level. For clarity, FIG. 3 illustrates the network-slice manager 320 as separate from the core network neural network manager 312 and the E2E ML controller 318, but in alternate or additional implementations, the core network neural network manager 312 includes functionality performed by the network-slice manager 320 or vice versa. Further, while FIG. 3 illustrates the core network server 302 implementing the network-slice manager 320, alternate or additional devices can implement the network-slice manager 320, such as the base station 120 and/or other network elements.

The core network server 302 also includes a core network interface 322 for communication of user-plane, control-plane, and other information with the other functions or entities in the core network 150, base stations 120, or UE 110. In implementations, the core network server 302 communicates NN formation configurations to the base station 120 using the core network interface 322. The core network server 302 alternately or additionally receives feedback from the base stations 120 and/or the UE 110, by way of the base stations 120, using the core network interface 322.

Having described an example environment and example devices that can be utilized for neural network formation configuration feedback in wireless communications, consider now a discussion of configurable machine-learning modules that is in accordance with one or more implementations.

Configurable Machine-Learning Modules

Figure 4:
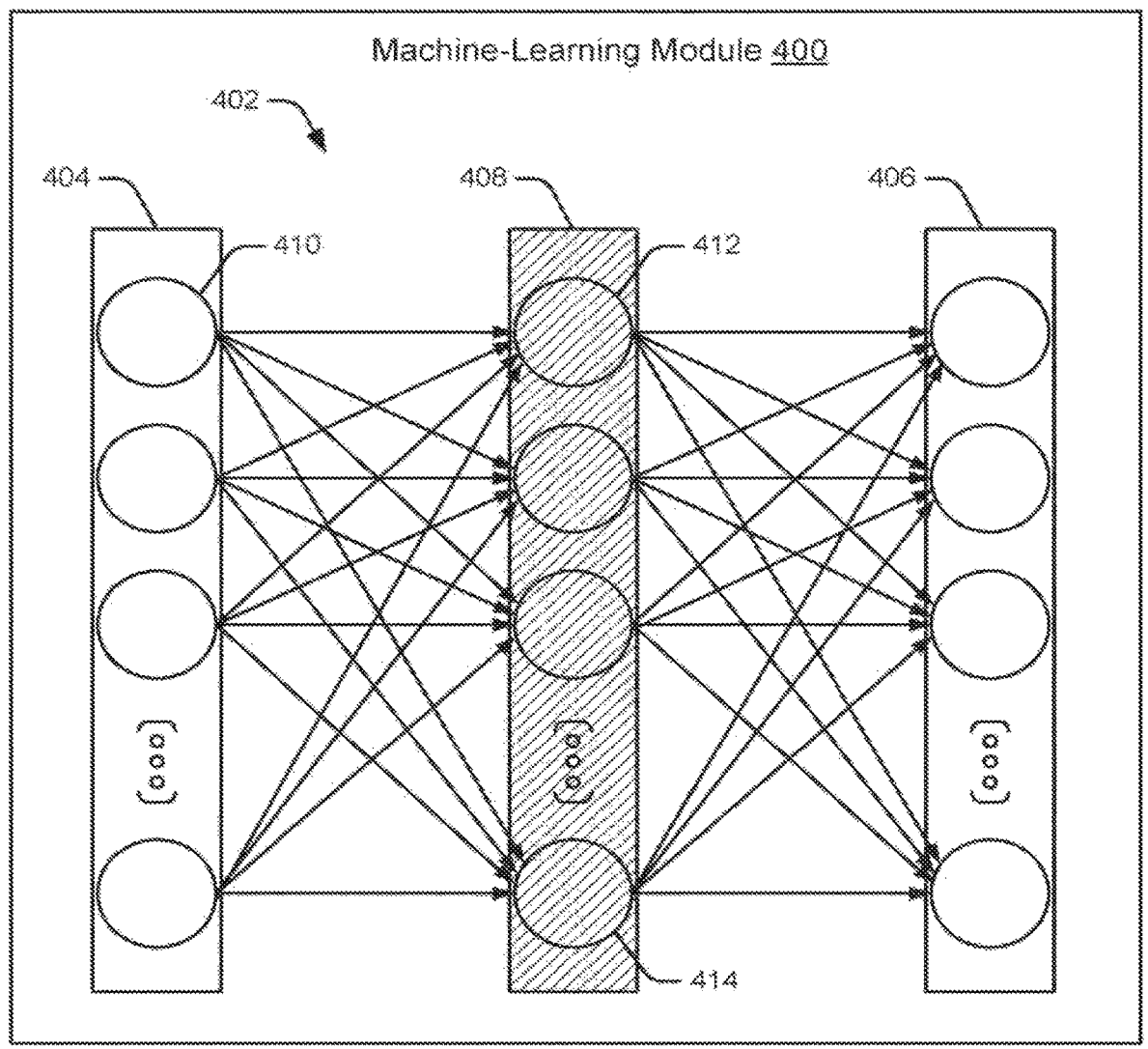
FIG. 4 illustrates an example machine-learning module that can implement various aspects of machine-learning architectures for broadcast and multicast communications.

FIG. 4 illustrates an example machine-learning module 400. The machine-learning module 400 implements a set of adaptive algorithms that learn and identify patterns within data. The machine-learning module 400 can be implemented using any combination of software, hardware, and/or firmware.

In FIG. 4, the machine-learning module 400 includes a deep neural network 402 (DNN 402) with groups of connected nodes (e.g., neurons and/or perceptrons) that are organized into three or more layers. The nodes between layers are configurable in a variety of ways, such as a partially-connected configuration where a first subset of nodes in a first layer are connected with a second subset of nodes in a second layer, a fully-connected configuration where each node in a first layer are connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN, the machine-learning module 400 performs a variety of different types of analysis, including single linear regression, multiple linear regression, logistic regression, step-wise regression, binary classification, multiclass classification, multi-variate adaptive regression splines, locally estimated scatterplot smoothing, and so forth.

In some implementations, the machine-learning module 400 adaptively learns based on supervised learning. In supervised learning, the machine-learning module 400 receives various types of input data as training data. The machine-learning module 400 processes the training data to learn how to map the input to a desired output. As one example, the machine-learning module 400 receives digital samples of a signal as input data and learns how to map the signal samples to binary data that reflects information embedded within the signal. As another example, the machine-learning module 400 receives binary data as input data and learns how to map the binary data to digital samples of a signal with the binary data embedded within the signal. During a training procedure, the machine-learning module 400 uses labeled or known data as an input to the DNN. The DNN analyzes the input using the nodes and generates a corresponding output. The machine-learning module 400 compares the corresponding output to truth data and adapts the algorithms implemented by the nodes to improve the accuracy of the output data. Afterwards, the DNN applies the adapted algorithms to unlabeled input data to generate corresponding output data.

The machine-learning module 400 uses statistical analyses and/or adaptive learning to map an input to an output. For instance, the machine-learning module 400 uses characteristics learned from training data to correlate an unknown input to an output that is statistically likely within a threshold range or value. This allows the machine-learning module 400 to receive complex input and identify a corresponding output. Some implementations train the machine-learning module 400 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/de-multiplexing, transmission channel characteristics). This allows the trained machine-learning module 400 to receive samples of a signal as an input, such as samples of a downlink signal received at a user equipment, and recover information from the downlink signal, such as the binary data embedded in the downlink signal.

In FIG. 4, the DNN includes an input layer 404, an output layer 406, and one or more hidden layer(s) 408 that are positioned between the input layer 404 and the output layer 406. Each layer has an arbitrary number of nodes, where the number of nodes between layers can be the same or different. In other words, input layer 404 can have a same number and/or different number of nodes as output layer 406, output layer 406 can have a same number and/or different number of nodes than hidden layer(s) 408, and so forth.

Node 410 corresponds to one of several nodes included in input layer 404, where the nodes perform independent computations from one another. As further described, a node receives input data, and processes the input data using algorithm(s) to produce output data. At times, the algorithm(s) include weights and/or coefficients that change based on adaptive learning. Thus, the weights and/or coefficients reflect information learned by the neural network. Each node can, in some cases, determine whether to pass the processed input data to the next node(s). To illustrate, after processing input data, node 410 can determine whether to pass the processed input data to node 412 and/or node 414 of hidden layer(s) 408. Alternately or additionally, node 410 passes the processed input data to nodes based upon a layer connection architecture. This process can repeat throughout multiple layers until the DNN generates an output using the nodes of output layer 406.

A neural network can also employ a variety of architectures that determine what nodes within the neural network are connected, how data is advanced and/or retained in the neural network, what weights and coefficients are used to process the input data, how the data is processed, and so forth. These various factors collectively describe a NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternately or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer, and use the maximum value as the input into the single node of a second layer. A pooling parameter that indicates "average pooling" configures the neural network to generate an average value from the grouping of data generated by the nodes of the first layer and use the average value as the input to the single node of the second layer.

A kernel parameter indicates a filter size (e.g., a width and height) to use in processing input data. Alternately or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network.

Weight parameters specify weights and biases used by the algorithms within the nodes to classify input data. In implementations, the weights and biases are learned parameter configurations, such as parameter configurations generated from training data.

A layer parameter specifies layer connections and/or layer types, such as a fully-connected layer type that indicates to connect every node in a first layer (e.g., output layer 406) to every node in a second layer (e.g., hidden layer(s) 408), a partially-connected layer type that indicates which nodes in the first layer to disconnect from the second layer, an activation layer type that indicates which filters and/or layers to activate within the neural network, and so forth. Alternately or additionally, the layer parameter specifies types of node layers, such as a normalization layer type, a convolutional layer type, a pooling layer type, etc.

While described in the context of pooling parameters, kernel parameters, weight parameters, and layer parameters, it is to be appreciated that other parameter configurations can be used to form a DNN without departing from the scope of the claimed subject matter. Accordingly, a NN formation configuration can include any other type of parameter that can be applied to a DNN that influences how the DNN processes input data to generate output data.

Some implementations configure machine-learning module 400 based on a current operating environment. To illustrate, consider a machine-learning module trained to generate binary data from digital samples of a signal. A transmission environment oftentimes modifies the characteristics of a signal traveling through the environment. Transmission environments oftentimes change, which impacts how the environment modifies the signal. A first transmission environment, for instance, modifies a signal in a first manner, while a second transmission environment modifies the signal in a different manner than the first. These differences impact an accuracy of the output results generated by a machine-learning module. For instance, a neural network configured to process communications transmitted over the first transmission environment may generate errors when processing communications transmitted over the second transmission environment (e.g., bit errors that exceed a threshold value).

Various implementations generate and store NN formation configurations and/or NN formation configuration elements (e.g., various architecture and/or parameter configurations) for different transmission environments. Base stations 120 and/or core network server 302, for example, train the machine-learning module 400 using any combination of BS neural network manager 268, training module 270, core network neural network manager 312, and/or training module 314. The training can occur offline when no active communication exchanges are occurring, or online during active communication exchanges. For example, the base stations 120 and/or core network server 302 can mathematically generate training data, access files that store the training data, obtain real-world communications data, etc. The base stations 120 and/or core network server 302 then extract and store the various learned NN formation configurations in a neural network table. Some implementations store input characteristics with each NN formation configuration, where the input characteristics describe various properties of the transmission environment corresponding to the respective NN formation configuration. In implementations, a neural network manager selects a NN formation configuration and/or NN formation configuration element(s) by matching a current transmission environment and/or current operating environment to the input characteristics.

Having described configurable machine-learning modules, consider now a discussion of deep neural networks in wireless communication systems that is in accordance with one or more implementations.

Deep Neural Networks in Wireless Communication Systems

Wireless communication systems include a variety of complex components and/or functions, such as the various devices and modules described with reference to the example environment 100 of FIG. 1, the example device diagram 200 of FIG. 2, and the example device diagram 300 of FIG. 3. In some implementations, the devices participating in the wireless communication system chain together a series of functions to enable the exchange of information over wireless connections.

Figure 5:
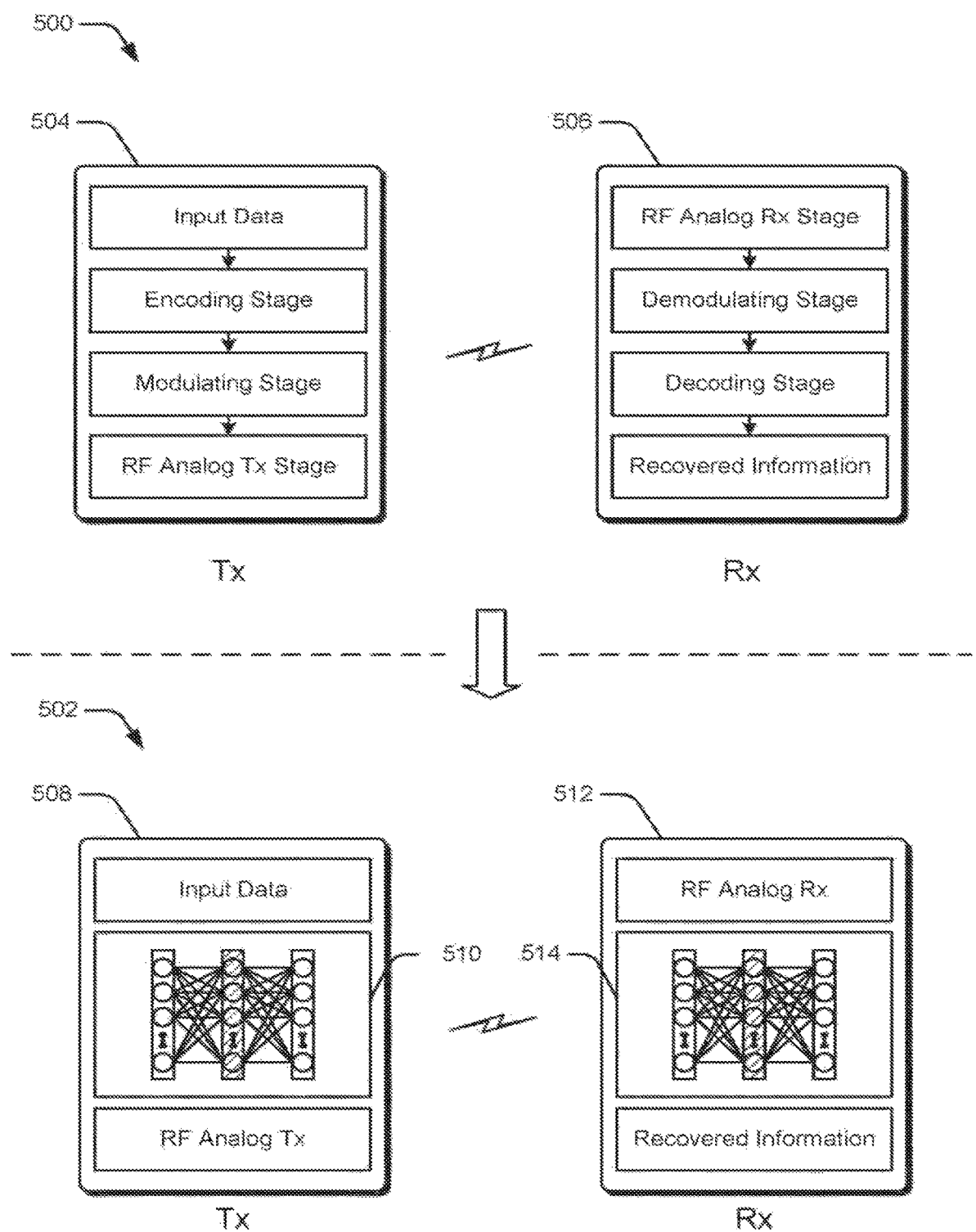
FIG. 5 illustrates example block diagrams of processing chains utilized by devices to process communications transmitted over a wireless communication system.

To demonstrate, FIG. 5 illustrates example block diagram 500 and example block diagram 502, each of which depicts an example processing chain utilized by devices in a wireless communication system. For simplicity, the block diagrams illustrate high-level functionality, and it is to be appreciated that the block diagrams may include additional functions that are omitted from FIG. 5 for the sake of clarity.

In the upper portion of FIG. 5, block diagram 500 includes a transmitter block 504 and a receiver block 506. Transmitter block 504 includes a transmitter processing chain that progresses from top to bottom. The transmitter processing chain begins with input data that progresses to an encoding stage, followed by a modulating stage, and then a radio frequency (RF) analog transmit (Tx) stage. The encoding stage can include any type and number of encoding stages employed by a device to transmit data over the wireless communication system.

To illustrate, an encoding stage receives binary data as input, and processes the binary data using various encoding algorithms to append information to the binary data, such as frame information. Alternately or additionally, the encoding stage transforms the binary data, such as by applying forward error correction that adds redundancies to help information recovery at a receiver. As another example, the encoding stage converts the binary data into symbols.

An example modulating stage receives an output generated by the encoding stage as input and embeds the input onto a signal. For instance, the modulating stage generates digital samples of signal(s) embedded with the input from the encoding stage. Thus, in transmitter block 504, the encoding stage and the modulating stage represent a high-level transmitter processing chain that often includes lower-level complex functions, such as convolutional encoding, serial-to-parallel conversion, cyclic prefix insertion, channel coding, time/frequency interleaving, and so forth. The RF analog Tx stage receives the output from the modulating stage, generates an analog RF signal based on the modulating stage output, and transmits the analog RF signal to receiver block 506.

Receiver block 506 performs complementary processing relative to transmitter block 504 using a receiver processing chain. The receiver processing chain illustrated in receiver block 506 progresses from top to bottom and includes an RF analog receive (Rx) stage, followed by a demodulating stage, and a decoding stage.

The RF analog Rx stage receives signals transmitted by the transmitter block 504, and generates a signal used by the demodulating stage. As one example, the RF analog Rx stage includes a down-conversion component and/or an analog-to-digital converter (ADC) to generate samples of the received signal. The demodulating stage processes input from the RF analog Rx stage to extract data embedded on the signal (e.g., data embedded by the modulating stage of the transmitter block 504). The demodulating stage, for instance, recovers symbols and/or binary data.

The decoding stage receives input from the demodulating stage, such as recovered symbols and/or binary data, and processes the input to recover the transmitted information. To illustrate, the decoding stage corrects for data errors based on forward error correction applied at the transmitter block, extracts payload data from frames and/or slots, and so forth. Thus, the decoding stage generates the recovered information.

As noted, the transmitter and receiver processing chains illustrated by transmitter block 504 and receiver block 506 have been simplified for clarity and can include multiple complex modules. At times, these modules are specific to particular functions and/or conditions. Consider, for example, a receiver processing chain that processes Orthogonal Frequency Division Modulation (OFDM) transmissions. To recover information from OFDM transmissions, the receiver block 506 oftentimes includes multiple processing blocks, each of which is dedicated to a particular function, such as an equalization block that corrects for distortion in a received signal, a channel estimation block that estimates transmission channel properties to identify the effects on a transmission due to scattering, power decay, and so forth. At high frequencies, such as 5G mmW signals in the 6 GHz band, these blocks can be computationally and/or monetarily expensive (e.g., require substantial processing power, require expensive hardware). Further, implementing blocks that generate outputs with an accuracy within a desired threshold oftentimes requires more specific and less flexible components. To illustrate, an equalization block that functions for 5G mmW signals in the 6 GHz band may not perform with the same accuracy at other frequency bands, thus necessitating different equalization blocks for different bands and adding complexity to the corresponding devices.

Some implementations include DNNs in the transmission and/or receiver processing chains. In block diagram 502, transmitter block 508 includes one or more deep neural network(s) 510 (DNNs 510) in the transmitter processing chain, while receiver block 512 includes one or more deep neural network(s) 514 (DNNs 514) in the receiver processing chain.

For simplicity, the DNNs 510 in the transmitter block 508 correspond to the encoding stage and the modulating stage of transmitter block 504. It is to be appreciated, however, that the DNNs 510 can perform any high-level and/or low-level operation found within the transmitter processing chain. For instance, a first DNN performs low-level transmitter-side forward error correction, a second DNN performs low-level transmitter-side convolutional encoding, and so forth. Alternately or additionally, the DNNs 510 perform high-level processing, such as end-to-end processing that corresponds to the encoding stage and the modulating stage of transmitter block 508.

In a similar manner, the DNNs 514 in receiver block 512 perform receiver processing chain functionality (e.g., demodulating stage, decoding stage). The DNNs 514 can perform any high-level and/or low-level operation found within the receiver processing chain, such as low-level receiver-side bit error correction, low-level receiver-side symbol recovery, high-level end-to-end demodulating and decoding, etc. Accordingly, DNNs 514 in wireless communication systems can be configured to replace high-level operations and/or low-level operations in transmitter and receiver processing chains. At times, the DNNs 514 performing the high-level operations and/or low-level operations can be configured and/or reconfigured based on a current operating environment as further described. This DNN reconfigurability, along with DNN coefficient updates, provides more flexibility and adaptability to the processing chains relative to the more specific and less flexible components.

Some implementations process communication exchanges over the wireless communication system using multiple DNNs, where each DNN has a respective purpose (e.g., uplink processing, downlink processing, uplink encoding processing, downlink decoding processing, etc.). To demonstrate, consider now FIG. 6 that illustrates an example operating environment 600 that includes UE 110 and base station 120. In implementations, the UE 110 and base station 120 exchange communications with one another over a wireless communication system by processing the communications using multiple DNNs.

Figure 6:
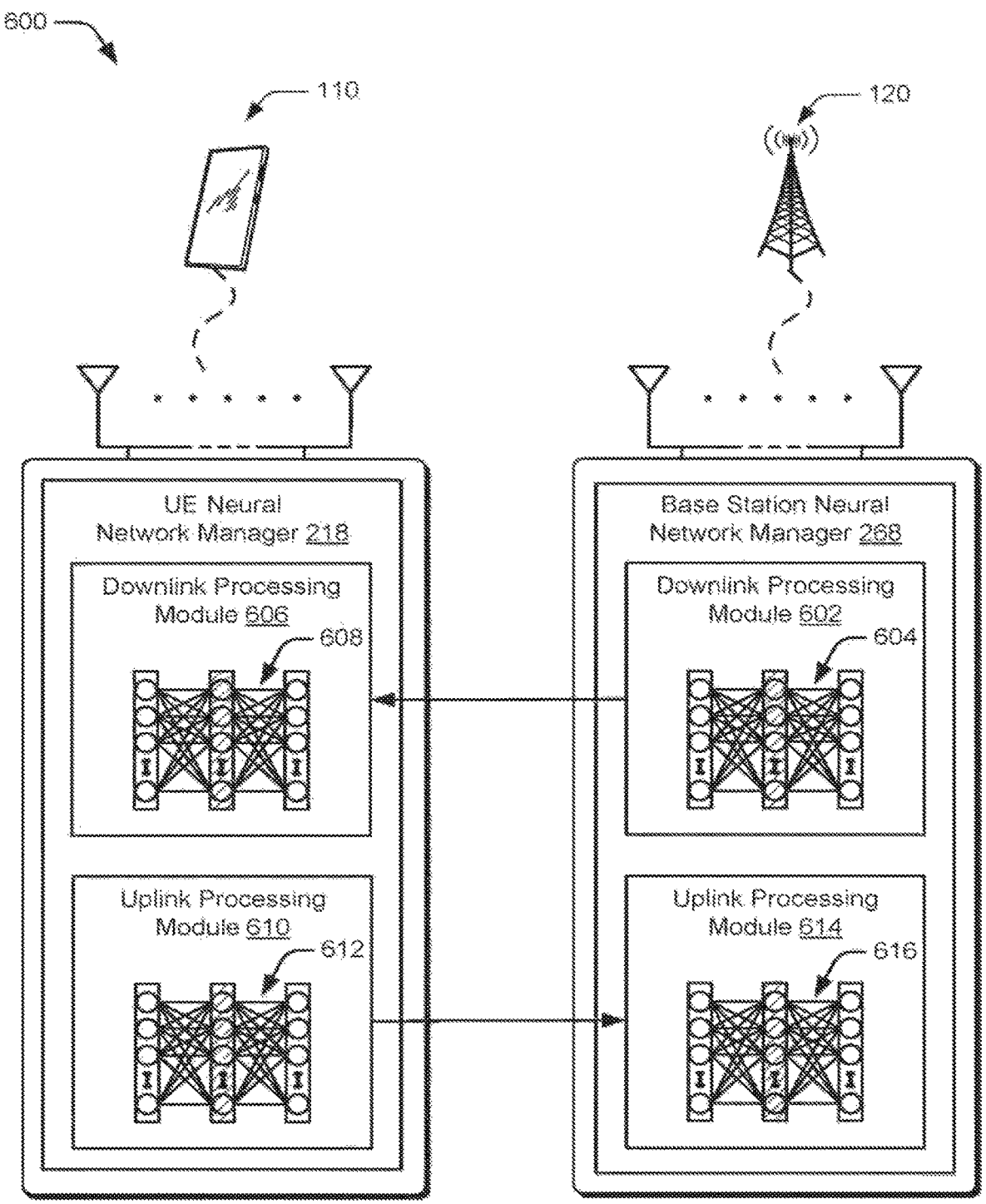
FIG. 6 illustrates an example operating environment in which multiple deep neural networks are utilized in a wireless communication system.

In FIG. 6, the base station neural network manager 268 of the base station 120 includes a downlink processing module 602 for processing downlink communications, such as for generating downlink communications transmitted to the UE 110. To illustrate, the base station neural network manager 268 forms deep neural network(s) 604 (DNNs 604) in the downlink processing module 602 using NN formation configurations as further described. In some examples, the DNNs 604 correspond to the DNNs 510 of FIG. 5. In other words, the DNNs 604 perform some or all of the transmitter processing functionality used to generate downlink communications.

Similarly, the UE neural network manager 218 of the UE 110 includes a downlink processing module 606, where the downlink processing module 606 includes deep neural network(s) 608 (DNNs 608) for processing (received) downlink communications. In various implementations, the UE neural network manager 218 forms the DNNs 608 using NN formation configurations. In FIG. 6, the DNNs 608 correspond to the DNNs 514 of FIG. 5, where the deep neural network(s) 606 of UE 110 perform some or all receiver processing functionality for (received) downlink communications. Accordingly, the DNNs 604 and the DNNs 608 perform complementary processing to one another (e.g., encoding/decoding, modulating/demodulating).

The DNNs 604 and/or DNNs 608 can include multiple deep neural networks, where each DNN is dedicated to a respective channel, a respective purpose, and so forth. The base station 120, as one example, processes downlink control channel information using a first DNN of the DNNs 604, processes downlink data channel information using a second DNN of the DNNs 604, and so forth. As another example, the UE 110 processes downlink control channel information using a first DNN of the DNNs 608, processes downlink data channel information using a second DNN of the DNNs 608, etc.

The base station 120 and/or the UE 110 also process uplink communications using DNNs. In environment 600, the UE neural network manager 218 includes an uplink processing module 610, where the uplink processing module 610 includes deep neural network(s) 612 (DNNs 612) for generating and/or processing uplink communications (e.g., encoding, modulating). In other words, uplink processing module 610 processes pre-transmission communications as part of processing the uplink communications. The UE neural network manager 218, for example, forms the DNNs 612 using NN formation configurations. At times, the DNNs 612 correspond to the DNNs 510 of FIG. 5. Thus, the DNNs 612 perform some or all of the transmitter processing functionality used to generate uplink communications transmitted from the UE 110 to the base station 120.

Similarly, uplink processing module 614 of the base station 120 includes deep neural network(s) 616 (DNNs 616) for processing (received) uplink communications, where base station neural network manager 268 forms DNNs 616 using NN formation configurations as further described. In examples, the DNNs 616 of the base station 120 correspond to the DNNs 514 of FIG. 5, and perform some or all receiver processing functionality for (received) uplink communications, such as uplink communications received from UE 110. At times, the DNNs 612 and the DNNs 616 perform complementary functionality of one another. Alternately or additionally, the uplink processing module 610 and/or the uplink processing module 614 include multiple DNNs, where each DNN has a dedicated purpose (e.g., processes a respective channel, performs respective uplink functionality, and so forth). FIG. 6 illustrates the DNNs 604, 608, 612, and 616 as residing within the respective neural network managers to signify that the neural network managers form the DNNs, and it is to be appreciated that the DNNs can be formed external to the neural network managers (e.g., UE neural network manager 218 and base station neural network manager 268) within different components, processing chains, modules, etc.

Having described deep neural networks in wireless communication systems, consider now a discussion of signaling and control transactions over a wireless communication system that can be used to configure deep neural networks for downlink and uplink communications that is in accordance with one or more implementations.

Signaling and Control Transactions to Configure Deep Neural Networks

Figure 7:
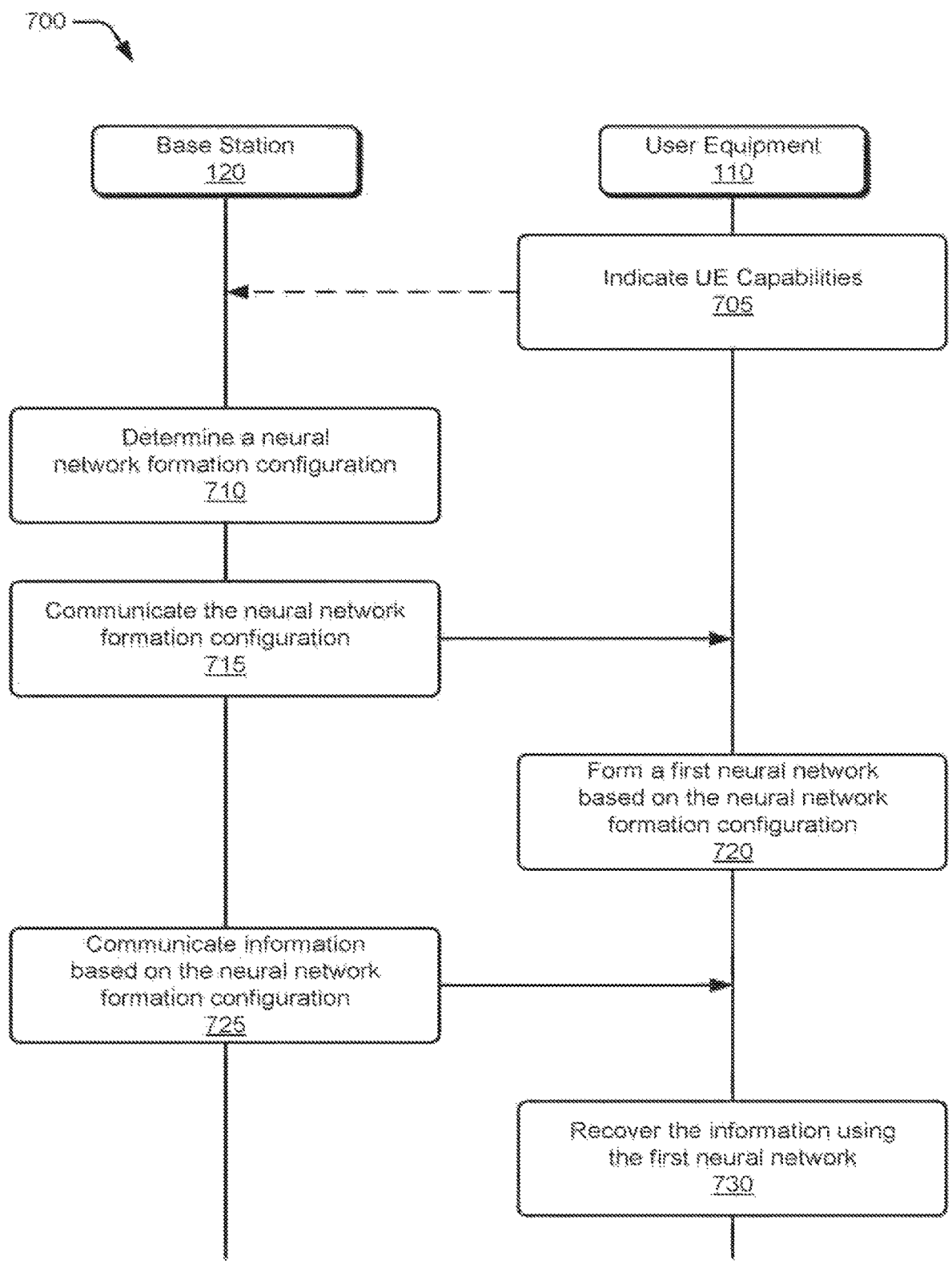
FIG. 7 illustrates an example transaction diagram between various devices for configuring a neural network using a neural network formation configuration.

FIG. 7 illustrates an example signaling and control transaction diagram 700 between a base station and a user equipment in accordance with one or more aspects of neural network formation configurations in wireless communication. Alternate or additional implementations include transactions that include a core network server. For example, the core network server 302 performs, in some implementations, various signaling and control actions performed by the base station 120 as illustrated by FIG. 7. The signaling and control transactions may be performed by the base station 120 and the UE 110 of FIG. 1 using elements of FIGS. 1-6. For clarity, FIG. 7 omits the core network server 302, but alternate implementations include the core network server as further described.

As illustrated, at 705, the UE 110 optionally indicates UE capabilities (e.g., capabilities supported by the UE) to a network entity, such as the base station 120. In some implementations, the UE capabilities include ML-related capabilities, such as a maximum kernel size capability, a memory limitation, a computation capability, supported ML architectures, supported number of layers, available processing power, memory limitation, available power budget, and fixed-point processing versus floating point processing. At times, the base station forwards the UE capabilities to a core network server (e.g., the core network server 302).

At 710 the base station 120 determines a neural network formation configuration. In determining the neural network formation configuration, the base station analyzes any combination of information, such as a channel type being processed by the deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth. In some implementations, the base station 120 determines the neural network formation configuration based upon the UE capabilities indicated at 705. Alternately or additionally, the base station 120 obtains the UE capabilities from a networked storage device, such as a server. In some implementations, the core network server 302 determines the neural network formation configuration in manner(s) similar to that described with respect to the base station, and communicates the determined neural network formation configuration to the base station.

The base station 120, for instance, receives message(s) from the UE 110 (not shown) that indicates one or more capabilities of the UE, such as, by way of example and not of limitation, connectivity information, dual-connectivity information, carrier aggregation capabilities, downlink physical parameter values, uplink physical parameter values, supported downlink/uplink categories, inter-frequency handover, and ML-capabilities (e.g., a maximum kernel size capability, a memory limitation, a computation capability, supported ML architectures, supported number of layers, available processing power, memory limitation, available power budget, fixed-point processing vs. floating point processing). The base station 120 (and/or the core network server 302) identifies, from the message(s), the UE capabilities that impact how the UE processes communications, and/or how the base station processes communications from the UE and selects a neural network formation configuration with improved output accuracy relative to other neural network formation configurations.

In some implementations, the base station 120 (and/or the core network server 302) selects the neural network formation configuration from multiple neural network formation configurations. Alternately or additionally, the base station 120 (and/or the core network server 302) selects the neural network formation configuration by selecting a subset of neural network architecture formation elements in a neural network table. At times, the base station 120 (and/or the core network server 302) analyzes multiple neural network formation configurations and/or multiple neural network formation configuration elements included in a neural network table, and determines the neural network formation configuration by selects and/or creates a neural network formation configuration that aligns with current channel conditions, such as by matching the channel type, transmission medium properties, etc., to input characteristics as further described. Alternately or additionally, the base station 120 (and/or the core network server 302) selects the neural network formation configuration based on network parameters, such as scheduling parameters (e.g., scheduling Multiple User, Multiple Input, Multiple Output (MU-MIMO) for downlink communications, scheduling MU-MIMO for uplink communications).

At 715, the base station 120 communicates the neural network formation configuration to the UE 110. Alternately or additionally, the core network server 302 communicates the neural network formation configuration to the base station 120, and the base station 120 forwards the neural network formation configuration to the UE 110. In some implementations, the base station transmits a message that specifies the neural network formation configuration, such as by transmitting a message that includes an index value that maps to an entry in a neural network table, such as neural network table 216 of FIG. 2. Alternately or additionally, the base station transmits a message that includes neural network parameter configurations (e.g., weight values, coefficient values, number of filters). In some cases, the base station 120 specifies a purpose and/or processing assignment in the message, where the processing assignment indicates what channels, and/or where in a processing chain, the configured neural network applies to, such as a downlink control channel processing, an uplink data channel processing, downlink decoding processing, uplink encoding processing, etc. Accordingly, the base station can communicate a processing assignment with a neural network formation configuration.

In some implementations, the base station 120 communicates multiple neural network formation configurations to the UE 110. For example, the base station transmits a first message that directs the UE to use a first neural network formation configuration for uplink encoding, and a second message that directs the UE to use a second neural network formation configuration for downlink decoding. In some scenarios, the base station 120 communicates multiple neural network formation configurations, and the respective processing assignments, in a single message. As yet another example, the base station communicates the multiple neural network formation configurations using different radio access technologies (RATs). The base station can, for instance, transmit a first neural network formation configuration for downlink communication processing to the UE 110 using a first RAT and/or carrier, and transmit a second neural network formation configuration for uplink communication processing to the UE 110 using a second RAT and/or carrier.

At 720, the UE 110 forms a first neural network based on the neural network formation configuration. For instance, the UE 110 accesses a neural network table using the index value(s) communicated by the base station to obtain the neural network formation configuration and/or the neural network formation configuration elements. Alternately or additionally, the UE 110 extracts neural network architecture and/or parameter configurations from the message. The UE 110 then forms the neural network using the neural network formation configuration, the extracted architecture and/or parameter configurations, etc. In some implementations, the UE processes all communications using the first neural network, while in other implementations, the UE processes select communications using the first neural network based on a processing assignment.

At 725, the base station 120 communicates information based on the neural network formation configuration. For instance, with reference to FIG. 6, the base station 120 processes downlink communications using a second neural network configured with complementary functionality to the first neural network. In other words, the second neural network uses a second neural network formation configuration that is complementary to the neural network formation configuration. In turn, at 730, the UE 110 recovers the information using the first neural network.

Having described signaling and control transactions that can be used to configure neural networks for processing communications, consider now a discussion of generating and communicating neural network formation configurations that is in accordance with one or more implementations.

Generating and Communicating Neural Network Formation Configurations

Figure 8:
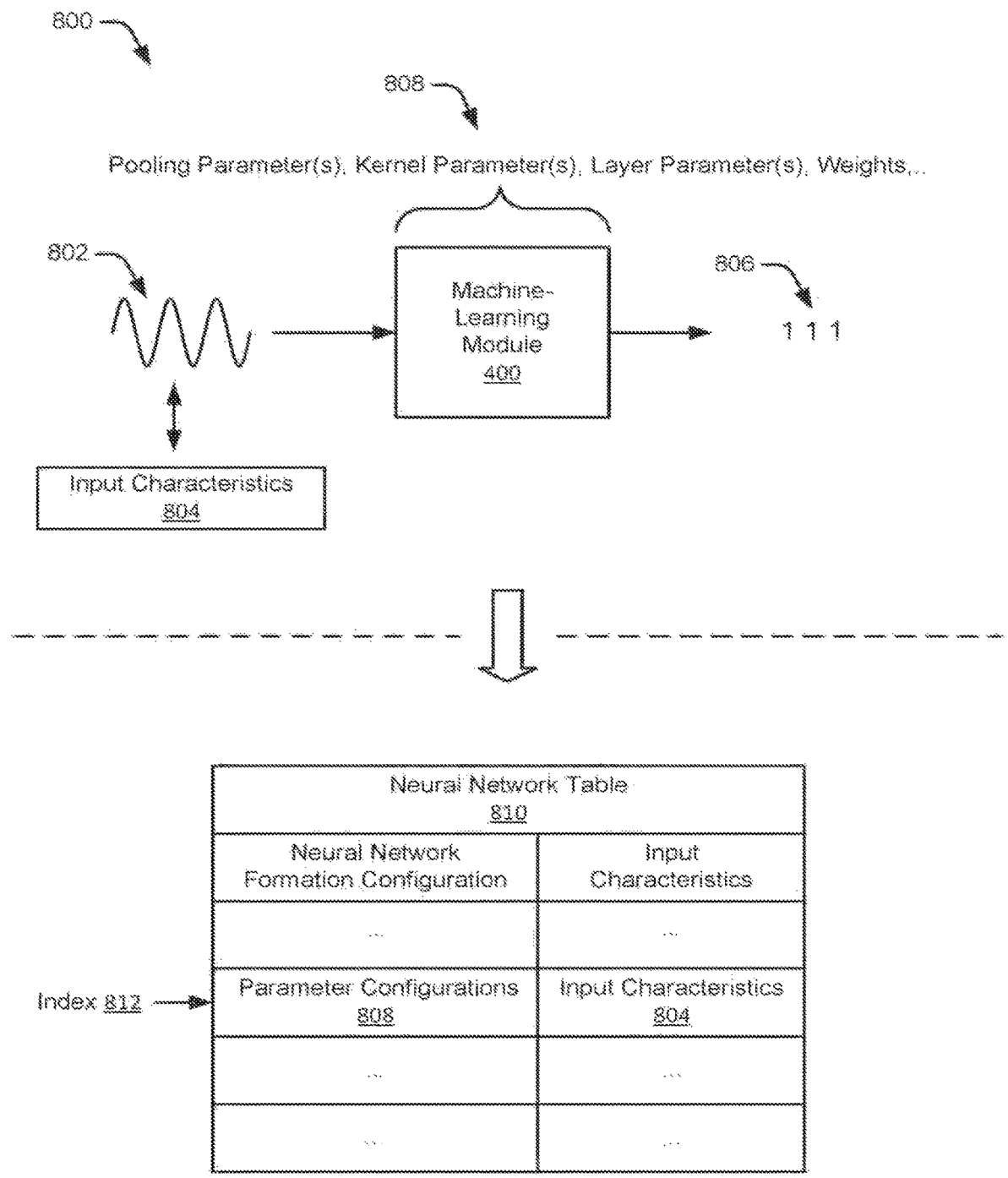
FIG. 8 illustrates an example of generating multiple neural network formation configurations.

In supervised learning, machine-learning modules process labeled training data to generate an output. The machine-learning modules receive feedback on an accuracy of the generated output and modify processing parameters to improve the accuracy of the output. FIG. 8 illustrates an example 800 that describes aspects of generating multiple NN formation configurations. At times, various aspects of the example 800 are implemented by any combination of training module 270, base station neural network manager 268, core network neural network manager 312, and/or training module 314 of FIGS. 2 and 3.

The upper portion of FIG. 8 includes machine-learning module 400 of FIG. 4. In implementations, a neural network manager determines to generate different NN formation configurations. To illustrate, consider a scenario in which the base station neural network manager 268 determines to generate a NN formation configuration by selecting a combination of NN formation configuration elements from a neural network table, where the NN formation configuration corresponds to a UE decoding and/or demodulating downlink communications. In other words, the NN formation configuration (by way of the combination of NN formation configuration elements) forms a DNN that processes downlink communications received by a UE. Oftentimes, however, transmission channel conditions vary which, in turn, affects the characteristics of the downlink communications. For instance, a first transmission channel distorts the downlink communications by introducing frequency offsets, a second transmission channel distorts the downlink communications by introducing Doppler effects, a third transmission channel distorts the downlink communications by introducing multipath channel effects, and so forth. To accurately process the downlink communications (e.g., reduce bit errors), various implementations select multiple NN formation configurations, where each NN formation configuration (and associated combination of NN formation configuration elements) corresponds to a respective input condition, such as a first transmission channel, a second transmission channel, etc.

Training data 802 represents an example input to the machine-learning module 400. In FIG. 8, the training data 802 represents data corresponding to a downlink communication. Training data 802, for instance, can include digital samples of a downlink communications signal, recovered symbols, recovered frame data, etc. In some implementations, the training module generates the training data mathematically or accesses a file that stores the training data. Other times, the training module obtains real-world communications data. Thus, the training module can train the machine-learning module 400 using mathematically generated data, static data, and/or real-world data. Some implementations generate input characteristics 804 that describe various qualities of the training data, such as transmission channel metrics, UE capabilities, UE velocity, and so forth.

Machine-learning module 400 analyzes the training data, and generates an output 806, represented here as binary data. Some implementations iteratively train the machine-learning module 400 using the same set of training data and/or additional training data that has the same input characteristics 804 to improve the accuracy of the machine-learning module 400. During training, the machine-learning module 400 modifies some or all of the architecture and/or parameter configurations of a neural network included in the machine-learning module 400, such as node connections, coefficients, kernel sizes, etc. At some point in the training, the training module determines to extract the architecture and/or parameter configurations 808 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module 400 to use as a NN formation configuration and/or NN formation configuration element(s). The architecture and/or parameter configurations can include any combination of fixed architecture and/or parameter configurations, and/or variable architectures and/or parameter configurations.

The lower portion of FIG. 8 includes neural network table 810 that represents a collection of NN formation configuration elements, such as neural network table 216, neural network table 272, and/or neural network table 316 of FIG. 2 and FIG. 3. The neural network table 810 stores various combinations of architecture configurations, parameter configurations 808, and input characteristics 804, but alternate implementations exclude the input characteristics 804 from the table. Various implementations update and/or maintain the NN formation configuration elements and/or the input characteristics 804 as the machine-learning module 400 learns additional information. For example, at index 812, the neural network manager and/or the training module updates neural network table 810 to include architecture and/or parameter configurations 808 generated by the machine-learning module 400 while analyzing the training data 802.

The neural network manager and/or the training module alternately or additionally adds the input characteristics 804 to the neural network table 810 and links the input characteristics 804 to the architecture and/or parameter configurations 808. This allows the input characteristics 804 to be obtained at a same time as the architecture and/or parameter configurations 808, such as through using an index value that references into the neural network table 810 (e.g., references NN formation configurations, references NN formation configuration elements). In some implementations, the neural network manager selects a NN formation configuration by matching the input characteristics to a current operating environment, such as by matching the input characteristics to current channel conditions, UE capabilities, UE characteristics (e.g., velocity, location, etc.) and so forth.

Figure 9:
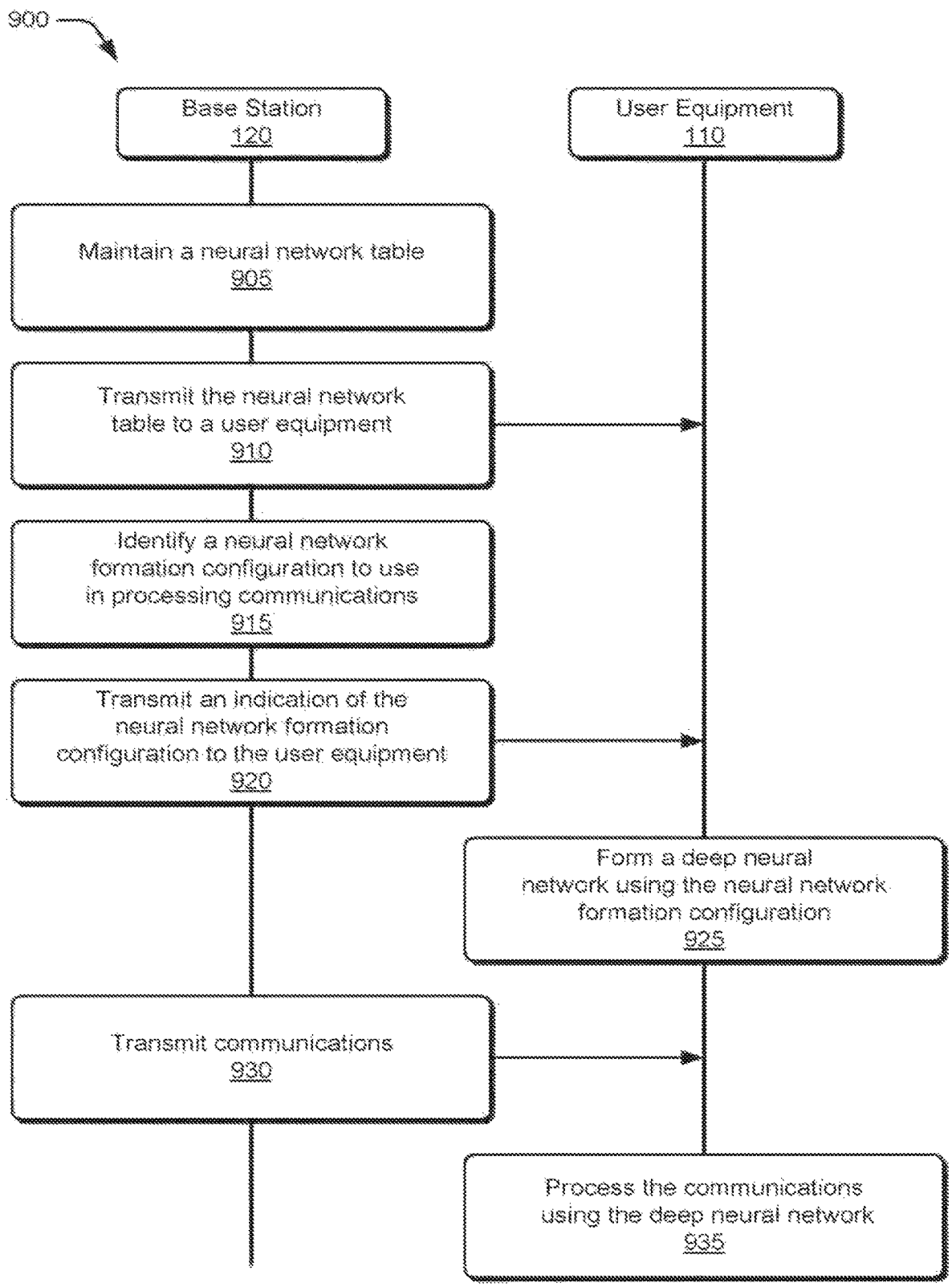
FIG. 9 illustrates an example transaction diagram between various devices for communicating neural network formation configurations.

Having described generating and communicating neural network formation configurations, consider now a discussion of signaling and control transactions over a wireless communication system that can be used to communicate neural network formation configurations that is in accordance with one or more implementations Signaling and Control Transactions to Communicate Neural Network Formation Configurations FIG. 9 illustrates an example signaling and control transaction diagram 900 between a base station and a user equipment in accordance with one or more aspects of communicating neural network formation configurations, such as communicating a NN formation configuration. In implementations, the signaling and control transactions may be performed by any one of the base stations 120 and the UE 110 of FIG. 1, using elements of FIGS. 1-8. In alternate or additional implementations, the signaling and control transactions may include interactions with the core network server 302 of FIG. 3 (not shown in FIG. 9). In implementations, portions or all of the signaling and control transactions described with reference to the signaling and control transaction diagram 900 correspond to signaling and control transactions described with reference to FIG. 7.

As illustrated, at 905 the base station 120 maintains a neural network table. Alternately or additionally, the core network server 302 maintains a neural network table. For example, a neural network manager (base station neural network manager 268, core network neural network manager 312) and/or a training module (training module 270, training module 314) generate and/or maintain a neural network table (e.g., neural network table 272, neural network table 316) using any combination of mathematically generated training data, data extracted from real-world communications, files, etc. In various implementations, the base station 120 (and/or the core network server 302) maintains multiple neural network tables, where each neural network table includes multiple neural network formation configurations and/or neural network formation configuration elements for a designated purpose, such as a first neural network table designated for data channel communications, a second neural network table designated for control channel communications, and so forth.

At 910, the base station 120 transmits the neural network table to the UE 110. In some implementations, the base station 120 first receives the neural network table from the core network server 302). As one example, the base station transmits the neural network table using layer 3 messaging (e.g., Radio Resource Control (RRC) messages). In transmitting the neural network table, the base station transmits any combination of architecture and/or parameter configurations that can be used to form a deep neural network, examples of which are provided in this disclosure. Alternately or additionally the base station transmits an indication with the neural network table that designates a processing assignment for the neural network table. Accordingly, the base station transmits multiple neural network tables to the UE, with a respective processing assignment designated for each neural network table. In some implementations, the base station 120 broadcasts the neural network table(s) to a group of UEs. Other times, the base station 120 transmits a UE-dedicated neural network table to the UE 110.

At 915, the base station 120 identifies a neural network formation configuration to use in processing communications. Alternately or additionally, the core network server 302 identifies the neural network formation configuration, and communicates the neural network formation configuration to the base station 120. For example, the base station determines a neural network formation configuration to use in processing the communications by selecting a combination of neural network formation architecture elements, such as that described at 710 of FIG. 7, by analyzing any combination of information, such as a channel type being processed by a deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth. In some implementations, the base station 120 identifies a default neural network formation configuration to use as the neural network formation configuration. Thus, identifying the neural network formation configuration can include identifying default neural network formation configuration and/or updates to a neural network formation configuration.

In identifying the neural network formation configuration, the base station 121 (and/or the core network server 302) ascertains a neural network formation configuration in the neural network table that corresponds to the determined neural network formation configuration. In other words, the base station 120 identifies a neural network formation configuration and/or neural network formation configuration elements in neural network table 272 and/or neural network table 216 of FIG. 2 that align with the determined neural network formation configuration, such as by correlating and or matching input characteristics. In identifying the neural network formation configuration and/or neural network formation configuration elements in the neural network table, the base station identifies index value(s) of the neural network formation configuration and/or neural network formation configuration elements.

At 920, the base station 120 transmits an indication that directs the UE 110 to form a deep neural network using a neural network formation configuration from the neural network table. For example, similar to that described at 715 of FIG. 7 and/or at 840 of FIG. 8, the base station 120 communicates the index value(s) to the UE 110, and directs the UE 110 to form the deep neural network using the neural network formation configuration indicated by the index value(s). The base station can transmit the indication to the UE in any suitable manner. As one example, the base station transmits index value(s) that corresponds to the neural network formation configuration using a layer 2 message (e.g., a Radio Link Control (RLC) message, Medium Access Control (MAC) control element(s)). In some implementations, the base station compares a current operating environment (e.g., one or more of channel conditions, UE capabilities, BS capabilities, metrics) to input characteristics stored within the neural network table and identifies stored input characteristics aligned with the current operating environment. In turn, the base station obtains the index value of stored input characteristics which, in turn, provides the index value of the neural network formation configuration and/or neural network formation configuration elements. The base station 120 then transmits the index value(s) as the indication. At times, the base station 120 includes a processing assignment to indicate a position in a processing chain to apply the deep neural network. In some implementations, the base station transmits the index value(s) and/or processing assignment using a downlink control channel.

At times, the base station transmits rule(s) to the UE specifying operating parameters related to applying the neural network formation configuration. In one example, the rules include a time instance that indicates when to process communications with the deep neural network formed using the neural network formation configuration. Alternately or additionally, the rules specify a time threshold value that directs the UE to use a default neural network formation configuration instead of the specified neural network formation configuration when a data channel and control channel are within the time threshold value. Additionally, or alternatively, a rule may direct the user equipment to use the same neural network formation configuration for data channel communications and control channel communications when a data channel and control channel are within the time threshold value. To illustrate, consider an example in which the UE processes data channel communications using a first deep neural network (formed using a first neural network formation configuration), and control channel communications using a second deep neural network (formed using a second neural network formation configuration). If the data channel communications and control channel communications fall within the time threshold value specified by the time instance, the UE processes both channels using a default deep neural network (formed with the default neural network formation configuration) and/or the same deep neural network, since there may not be enough time to switch between the first deep neural network and the second deep neural network.

At times, the base station specifies a default neural network formation configuration to UE(s) using a downlink control channel to communicate the default neural network formation configuration, where the default neural network formation configuration forms a deep neural network that processes a variety of input data. In some implementations, the default neural network formation configuration forms a deep neural network that processes the variety of input data with an accuracy within a threshold range. The default neural network formation configuration can include a generic neural network formation configuration.

To illustrate, some implementations generate or select neural network formation configurations for specific operating conditions, such as a first neural network formation configuration specific to UE downlink control channel processing (e.g., demodulating and/or deciding) with a current operating environment "X", a second neural network formation configuration specific to UE downlink control channel processing with a current operating environment "Y", and so forth. For example, a first neural network formation configuration can correlate to a current operating environment in which a detected interference level is high, a second neural network formation configuration can correlate to a current operating environment in which a detected interference level is low, a third neural network formation configuration can correlate to a current operating environment in which a connected UE appears stationary, a fourth neural network formation configuration can correlate to a current operating environment in which the connected UE appears to be moving and with a particular velocity, and so forth.

Forming a deep neural network using a neural network formation configuration for specific operating conditions improves (relative to forming the deep neural network with other neural network formation configurations) an accuracy of the output generated by the deep neural network when processing input data corresponding to the specific operating conditions. However, this introduces a tradeoff insofar as the deep neural network formed with the neural network formation configuration for specific operating conditions generates output with less accuracy when processing input associated with other operating conditions. Conversely, a default neural network formation configuration corresponds to a neural network formation configuration that processes a wider variety of input, such as a variety of input that spans more operating conditions. In other words, a deep neural network configured with a default neural network formation configuration processes a larger variety of communications relative to neural network formation configurations directed to specific operating conditions.

At 925, the UE 110 forms the deep neural network using the neural network formation configuration. The UE, as one example, extracts the index value(s) transmitted by the base station 120, and obtains the neural network formation configuration and/or neural network formation configuration elements by accessing the neural network table using the index value(s). Alternately or additionally, the UE 110 extracts the processing assignment, and forms the deep neural network in the processing chain as specified by the processing assignment.

At 930, the base station 120 transmits communications to the UE 110, such as downlink data channel communications. At 935, the UE 110 processes the communications using the deep neural network. For instance, the UE 110 processes the downlink data channel communications using the deep neural network to recover the data. As another example, processing the communications includes processing a reply to the communications, where the UE 110 processes, using the deep neural network, uplink communications in reply to the downlink communications.

Having described signaling and control transactions that can be used to communicate neural network formation configurations, consider now a discussion of E2E ML for wireless networks that is in accordance with one or more implementations.

E2E ML for Wireless Networks

Aspects of an end-to-end communication (E2E communication) involve two endpoints exchanging information over a communication path, such as through a wireless network. At times, the E2E communication performs a single-directional exchange of information, where a first endpoint sends information and a second endpoint receives the information. Other times, the E2E communication performs bi-directional exchanges of information, where both endpoints send and receive the information. The endpoints of an E2E communication can include any entity capable of consuming and/or generating the information, such as a computing device, an application, a service, and so forth. To illustrate, consider an example in which an application executing at a UE exchanges information with a remote service over a wireless network. For this example, the E2E communication corresponds to the communication path between the application and the remote service, where the application and the remote service act as endpoints.

While the E2E communication involves endpoints that exchange information, the E2E communication alternately or additionally includes intermediate, entities (e.g., devices, applications, services) that participate in the exchange of information. To illustrate, consider again the example of an E2E communication established through a wireless network where an application at a UE functions as a first endpoint and a remote service functions as a second endpoint. In establishing the E2E communication between the endpoints, the wireless network utilizes any combination of UE(s), base station(s), core network server(s), remote network(s), remote service(s), and so forth, such as that described with reference to the environment 100 of FIG. 1. Thus, intermediary entities, such as the base station 120 and the core network 150, participate in establishing the E2E communication and/or participating in the E2E communication to enable an exchange of information between the endpoints.

Different factors impact the operational efficiency of the E2E communication and how the network elements process information exchanged through the E2E communication. For instance, with reference to an E2E communication established using a wireless network, a current operating environment (e.g., current channel conditions, UE location, UE movement, UE capabilities) impacts how accurately (e.g., bit error rate, packet loss) a receiving endpoint recovers the information. As one example, an E2E communication implemented using 5G mmW technologies becomes susceptible to more signal distortions relative to lower frequency sub-6 GHz signals as further described.

As another example, various implementations partition wireless network resources differently based on an end-to-end analysis of an E2E communication, where the wireless network resources include any combination of, by way of example and not of limitation, physical hardware, physical spectrum, logical channels, network functions, services provided, quality of service, latency, and so forth. Wireless network-resource partitioning allows the wireless network to dynamically allocate the wireless network resources based on an expected usage to improve an efficiency of how the wireless network resources are used (e.g., reduce the occurrence of unused and/or wasted resources). To illustrate, consider a variety of devices connecting to a wireless network, where the devices have different performance requirements relative to one another (e.g., a first device has secure data transfer requirements, a second device has high priority/low latency data transfer requirements, a third device has high data rate requirements). For at least some devices, a fixed and/or static distribution of wireless network resources (e.g., a fixed configuration for the wireless network resources used to implement an E2E communication) can lead to unused resources and/or fail to meet the performance requirements of some services. Thus, partitioning the wireless network resources can improve an overall efficiency of how the wireless network resources are utilized. However, the partitioning causes variations in how one pair of E2E endpoints exchanges information relative to a second pair of E2E endpoints.

To further demonstrate, consider a Quality-of-Service flow (QoS flow) that corresponds to information exchanged in a wireless network. In various implementations, an E2E communication includes and/or corresponds to a QoS flow. Some wireless networks configure a QoS flow with operating rules, priority levels, classifications, and so forth, that influence how information is exchanged through the QoS flow. For example, a QoS profile indicates to a wireless network the QoS parameters and/or QoS characteristics of a particular QoS flow, such as a Guaranteed Flow Bit Rate (GFBR) parameter used to indicate an uplink and/or downlink guaranteed bit rate for the QoS flow, a Maximum Flow Bit Rate (MFBR) parameters used to indicate a maximum uplink and/or downlink bit rate for the QoS flow, an Allocation and Retention Priority (ARP) parameter that indicates a priority level, a pre-emption capability, and/or pre-emption vulnerability of the QoS flow, a Reflective QoS attribute (RQA) that indicates a type of traffic carried on the QoS flow is subject to Reflective QoS (e.g., implicit updates), a Notification Control parameter that indicates whether notifications are requested when a guaranteed flow bit rate cannot be guaranteed, or resumes, for the QoS flow, an aggregate bit rate parameter that indicates an expected aggregate bit rate for the collective non-guaranteed-bit-rate (Non-GBR) flows associated with a particular UE, default parameters for 5QI and ARP priority levels, a Maximum Packet Loss Rate (MPLR) for uplink and/or downlink that indicates a maximum rate for lost packets of the QoS flow, a Resource Type characteristic that indicates types of resources that can be used by the QoS flow (e.g., GBR resource type, Delay-critical GBR resource type, non-GBR resource type), a scheduling priority level characteristic that distinguishes between multiple QoS flows of a same UE, a Packet Delay Budget characteristic that provides an upper bound to how long a packet may be delayed, a Packet Error Rate characteristic that indicates an upper bound for a rate of PDUs unsuccessfully received, an Averaging Window characteristics that indicates a window of data over which to calculate the GFBR and/or MFBR, a Maximum Data Burst Volume characteristic that indicates a largest amount of data that is required to be served over a pre-defined time period, and so forth. In some implementations, the parameters and/or characteristics that specify the configuration of a QoS flow can be pre-configured (e.g., default) and/or dynamically communicated, such as through the QoS profile. These variations impact how the wireless network partitions the various wireless network resources to support the QoS flow configuration.

For example, a UE can include three applications, where each application has a different performance requirement (e.g., resource type, priority level, packet delay budget, packet error rate, maximum data burst volume, averaging window, security level). These different performance requirements cause the wireless network to partition the wireless network resources assigned to the respective QoS flows assigned to each application differently from one another.

To demonstrate, consider a scenario in which the UE includes a gaming application, an augmented reality application, and a social media application. In some instances, the gaming application interacts with a remote service (through the data network) to connect with another gaming application to exchange audio in real-time, video in real-time, commands, views, and so forth, such that the gaming application has performance requirements with high data volume and low latency. The augmented reality application also interacts with a remote service through the data network to transmit location information and subsequently receive image data that overlays on top of a camera image generated at the UE. Relative to the gaming application, the augmented reality application utilizes less data, but has some time-sensitivity to maintain synchronization between a current location and a corresponding image overlay. Finally, the social media application interacts with a remote service through the data network to receive feed information, where the feed information has less data volume and time-criticality relative to data consumed by the augmented reality application and/or the gaming application.

Based upon these performance requirements, the wireless network establishes QoS flows between the applications and a data network, where the wireless network constructs each QoS flow based on QoS requirements, QoS parameters and/or QoS characteristics (e.g., resource type, priority level, packet delay budget, packet error rate, maximum data burst volume, averaging window, security level) that indicate a high data volume performance requirement and a time-sensitivity performance requirement. In implementations, the QoS requirements, the QoS parameters and/or the QoS characteristics included in a QoS profile correspond to the performance requirements of the QoS flow. As one example, the wireless network processes a QoS profile associated with a first QoS flow that configures any combination of a GFBR parameter, a Maximum Data Burst Volume characteristic, an ARP parameter, and so forth. The wireless network then constructs the QoS flow by partitioning the wireless network resources based on the QoS parameters and/or characteristics.

While the configurability of the QoS flows provide flexibility to the wireless network to dynamically modify how the wireless network resources are allocated, the configurability adds complexity in how the wireless network processes information that is exchanged between the endpoints. Some implementations train DNNs to perform some or all of the complex processing associated with exchanging information using E2E communications with various configurations. By training a DNN on the differing processing chain operations and/or wireless network resource partitioning, the DNN can replace the conventional complex functionality as further described. The usage of DNNs in an E2E communication also allows a network entity to adapt the DNN to changing operating conditions, such as by modifying various parameter configurations (e.g., coefficients, layer connections, kernel sizes).

One or more implementations determine an E2E ML configuration for processing information exchanged through an E2E communication. In some cases, an end-to-end machine-learning controller (E2E ML controller) obtains capabilities of device(s) associated with end-to-end communications in a wireless network, such as machine-learning (ML) capabilities of device(s) participating in the E2E communication, and determines an E2E ML configuration based on the ML capabilities (e.g., supported ML architectures, supported number of layers, available processing power, memory limitation, available power budget, fixed-point processing vs. floating point processing, maximum kernel size capability, computation capability) of the device(s). Alternately or additionally, the E2E ML controller identifies a current operating environment and determines the E2E ML configuration based on the current operating environment. Some implementations of the E2E ML controller communicate with a network-slice manager to determine an E2E ML configuration that corresponds to a network slice (e.g., a partitioning of wireless network resources). In determining the E2E ML configuration, some implementations of the E2E ML controller partition the E2E ML configuration based on the device(s) participating in the E2E communication and communicate a respective partition of the E2E ML configuration to each respective device.

Figure 10:
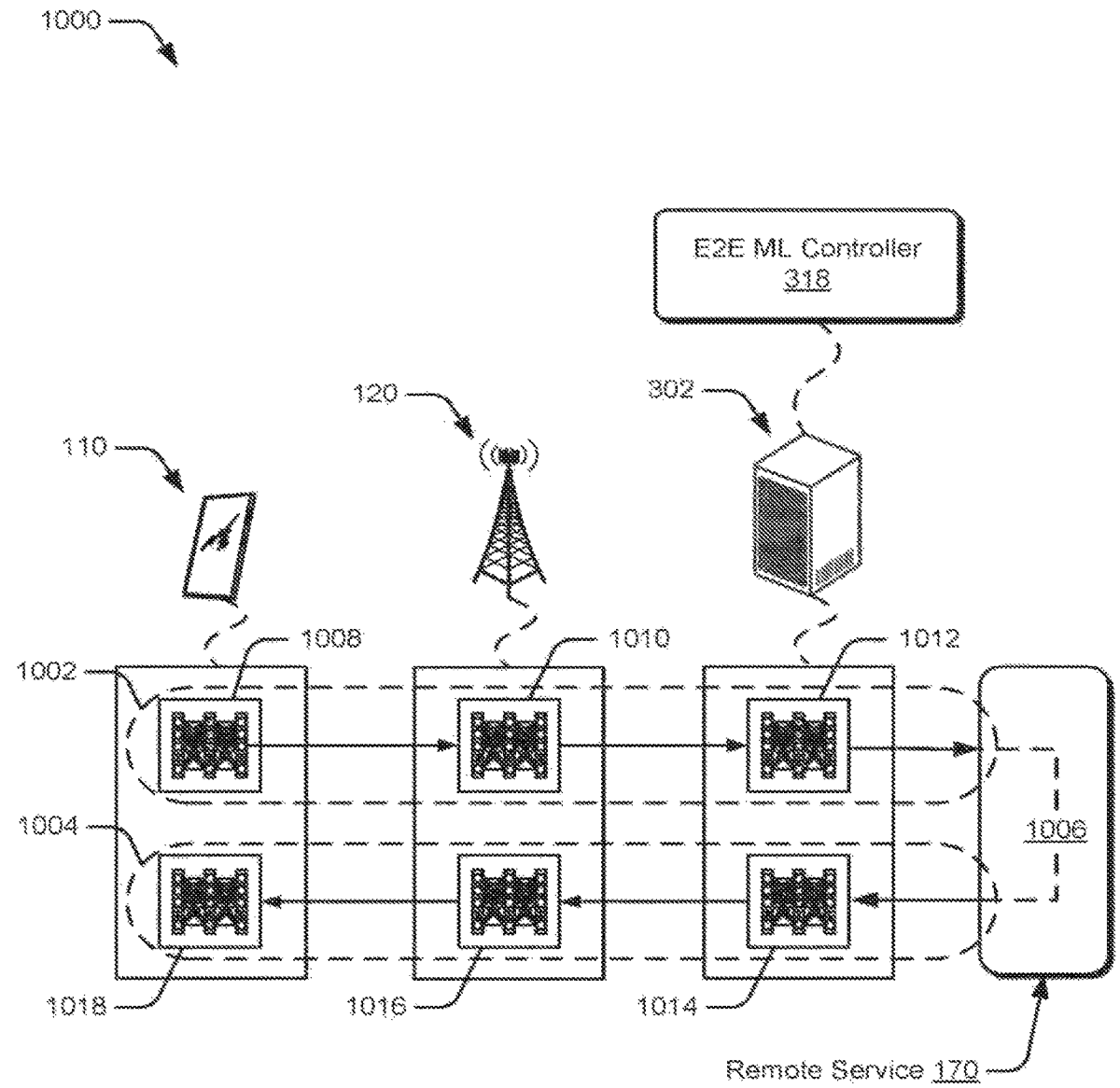
FIG. 10 illustrates an example environment in which various aspects of machine-learning architectures for broadcast and multicast communications can be implemented.

To demonstrate, consider FIG. 10 that illustrates an example environment 1000 in which example E2E ML configurations for E2E communications include DNNs operating at multiple devices. In implementations, the example environment 1000 illustrates aspects of machine-learning architectures for broadcast and multicast communications. The environment 1000 includes the UE 110, the base station 120, and the remote service 170 of FIG. 1, and the core network server 302 of FIG. 3. In implementations, the UE 110 and the remote service 170 exchange information with one another using E2E communication 1002 and E2E communication 1004. For clarity, the E2E communications 1002 and 1004 are illustrated as being separate and single-directional E2E communications such that the exchange of information over each communication E2E corresponds to one direction (e.g., E2E communication 1002 includes uplink transmissions, E2E communication 1004 includes downlink transmissions), but it is to be appreciated that in alternate or additional implementations, the E2E communication 1002 and the E2E communication 1004 correspond to a single, bi-directional E2E communication that includes both, signified in the environment 1000 with a dashed line 1006. In implementations, the E2E communication 1002 and the E2E communication 1004 (in combination) correspond to a single QoS flow.

The environment 1000 also includes the E2E ML controller 318 that is implemented by the core network server 302, where the E2E ML controller 318 determines an E2E ML configuration for the E2E communication 1002 and/or the E2E communication 1004. In some implementations, the E2E ML controller determines a first E2E ML configuration for the E2E communication 1002 and a second E2E ML configuration for the E2E communication 1004, such as when each E2E communication corresponds to single-directional information exchanges. In other implementations, the E2E ML controller determines an E2E ML configuration for a bi-directional E2E communication that includes both E2E communications 1002 and 1004. For example, in response to the UE 110 requesting a connection to the remote server 170, such as through the invocation of an application, the E2E ML controller determines an E2E ML configuration for a corresponding connection based on any combination of ML capabilities of the UE 110 (e.g., supported ML architectures, supported number of layers, processing power available for ML processing, memory constraints applied to ML processing, power budget available for ML processing, fixed-point processing vs. floating point processing), performance requirements associated with the requested connection (e.g., resource type, priority level, packet delay budget, packet error rate, maximum data burst volume, averaging window, security level), available wireless network resources, ML capabilities of intermediary devices (e.g., the base station 120, the core network server 302), a current operating environment (e.g., channel conditions, UE location), and so forth. As one example, with reference to FIGS. 9-1, 9-2, and FIG. 10, the E2E ML controller 318, by way of the core network server 302, receives base station metrics and/or UE metrics that describe the current operating environment. As another example, the E2E ML controller, by way of the core network server 302, receives base station ML capabilities and/or UE capabilities. Alternately or additionally, the E2E ML controller communicates with the network-slice manager 320 to identify a network slice that partitions the wireless network resources in a manner that supports QoS requirement(s).

In one or more implementations, the E2E ML controller 318 analyzes a neural network table based upon any combination of the device capabilities, the wireless network resource partitioning, the operating parameters, the current operating environment, the ML capabilities, and so forth, to determine the E2E ML configuration. While described as being implemented by the core network server 302, in alternate or additional implementations, the E2E ML controller 318 may be implemented by another network entity, such as the base station 120.

To illustrate, and with reference to FIG. 8, the training module 270 and/or the training module 314 train the machine-learning module 400 with variations of the training data 802 that reflect different combinations of the capabilities, wireless network resource partitioning, the operating parameters, the current operating environment, and so forth. The training module extracts and stores the architecture and/or parameter configurations (e.g., architecture and/or parameter configurations 808) in a neural network table such that, at a later point in time, the E2E ML controller 318 accesses the neural network table to obtain and/or identify neural network formation configurations that correspond to a determined E2E ML configuration. The E2E ML controller 318 then communicates the neural network formation configurations to various devices and directs the respective device to form a respective DNN as further described.

In determining the E2E ML configuration, the E2E ML controller 318 sometimes partitions the E2E ML configuration based on devices participating in the corresponding E2E communication. For example, the E2E ML controller 318 determines a first partition of the E2E ML configuration that corresponds to processing information at the UE 110, a second partition of the E2E ML configuration that corresponds to processing information at the base station 120, and a third partition of the E2E ML configuration that corresponds to processing information at the core network server 302, where determining the partitions can be based on any combination of the capabilities, wireless network resource partitioning, the operating parameters, the current operating environment, and so forth.

As one example, consider an E2E communication that corresponds to voice transmissions over a wireless network, such as the E2E communication 1002, the E2E communication 1004, and/or a combination of both E2E communications. In determining an E2E ML configuration for the E2E communication, the E2E ML controller 318 alternately or additionally identifies that performance requirement(s) of the E2E communication indicates large volumes of data transfer with low latency requirements. Based on the performance requirement(s), the E2E ML controller identifies an E2E ML configuration that, when formed by the respective DNN(s), performs end-to-end functionality that exchanges voice communications and satisfies the performance requirement(s). To illustrate, the E2E ML controller determines an E2E ML configuration that performs end-to-end functionality for transmitting voice from a UE to a core network server, such as signal processing, voice encoding, channel encoding, and/or channel modulation at the UE side, channel decoding, demodulation, and/or signal processing at the base station side, decoding voice at the core network server side, and so forth, and selects a configuration designed to satisfy the performance requirements.

Some implementations partition an E2E ML configuration based the ML capabilities of devices participating in the E2E communication and/or the performance requirements. A UE, for instance, may have less processing resources (e.g., processing capabilities, memory constraints, quantization constraints, fixed-point vs. floating point computations, FLOPS, power availability relative to a base station and/or a core network server, which can be indicated through the ML capabilities. In response to identifying the different processing resources through an analysis of the ML capabilities, the E2E ML controller partitions the E2E ML configuration such that a first partition (e.g., at the UE 110) forms a DNN that performs less processing than a DNN formed by a second or third partition (e.g., at the base station, at the core network server). Alternately or additionally, the E2E ML controller partitions the E2E ML configuration to produce neural networks designed to not exceed device capabilities. For example, based on analyzing the capabilities, the E2E ML controller directs the UE to form a DNN with less layers and a smaller kernel size relative to a DNN formed by the base station and/or the core network server based on processing constraints of the UE. Alternately or additionally, the E2E ML controller partitions the E2E ML configuration to form, at the UE) a neural network with an architecture (e.g., a convolutional neural network, a long short-term memory (LSTM) network, partially connected, fully connected) that processes information without exceeding memory constraints of the UE. In some instances, the E2E ML controller calculates whether an amount of computation performed at each device collectively meets a performance requirement corresponding to a latency budget and determines an E2E ML configuration designed to meet the performance requirement.

In the environment 1000, the E2E ML controller 318 determines a first E2E ML configuration for processing information exchanged through the E2E communication 1002 and determines to partition the first E2E ML configuration across multiple devices such as by partitioning the first E2E ML configuration across the UE 110, the base station 120, and the core network server 302 based on device capabilities. In other words, some implementations determine an E2E ML configuration that corresponds to a distributed DNN in which multiple devices implement and/or form portions of the DNN. To communicate the partitioning, the E2E ML controller 318 identifies a first neural network formation configuration (NN formation configuration) that corresponds to a first partition of the E2E ML configuration and communicates, by using the core network server 302, the first NN formation configuration to the UE 110. The E2E ML controller 318 and/or the core network server 302 then directs the UE to form a user equipment-side deep neural network 1008 (UE-side DNN 1008) for processing information exchanged through the E2E communication 1002. Similarly, the E2E ML controller 318 identifies a second NN formation configuration that corresponds to a second partition of the E2E ML configuration and communicates the second NN formation configuration to the base station 120. The E2E ML controller 318 and/or the core network server 302 then directs the base station 120 to form, using the second NN formation configuration, a base station-side deep neural network 1010 (B S-side DNN 1010) for processing information exchanged through the E2E communication 1002. The E2E ML controller 318 also identifies and communicates a third NN formation configuration to the core network server 302 to use in forming a core network server-side deep neural network 1012 (CNS-side DNN 1012) for processing information exchanged through the E2E communication 1002.

In implementations, the E2E ML controller 318 partitions the E2E ML configuration to distribute processing computations performed over the E2E communication such that the UE-side DNN 1008 performs less processing relative to the BS-side DNN 1010 (e.g., a UE-side DNN 1008 that uses less layers, less data processing points, and so forth, relative to the BS-side DNN 1010). Alternately or additionally, the E2E ML controller 318 partitions the E2E ML configuration such that the BS-side DNN 1010 performs less processing relative to CNS-side DNN 1012. In combination, the processing performed by the UE-side DNN 1008, the BS-side DNN 1010, and the CNS-side DNN 1012 exchange information across the E2E communication 1002.

In a similar manner, the E2E ML controller 318 determines a second E2E ML configuration for processing information exchanged through the E2E communication 1004, where the E2E ML controller partitions and/or distributes the second E2E ML configuration across multiple devices. In the environment 1000, this partitioning corresponds to a core network server-side deep neural network 1014 (CNS-side DNN 1014), a base station-side deep neural network 1016 (BS-side DNN 1016), and a user equipment-side deep neural network 1018 (UE-side DNN 1018). In combination, the processing performed by the CNS-side DNN 1014, the BS-side DNN 1016, and the UE-side DNN 1018 corresponds to exchanging information using the E2E communication 1004. While the E2E ML controller determines the first and second E2E ML configurations separately in the environment 1000 for single-directional E2E communications (e.g., the E2E communications 1002 and 1004), it is to be appreciated that in alternate or additional implementations, the E2E ML controller 318 determines a single E2E ML configuration that corresponds to exchanging bi-directional information using an E2E communication. Accordingly, with respect to the E2E communication 1002 and/or the E2E communication 1004, the E2E ML controller 318 determines a partitioned E2E ML configuration and communicates respective portions of the partitioned E2E ML configuration to the devices participating in the E2E communication 1002 and/or the E2E communication 1004.

In implementations, the E2E ML controller 318 periodically reassess metrics, performance requirements, wireless link performance, processing capabilities of devices or other aspects affecting, or providing an indication of, a current operating environment and/or a current performance (e.g., bit errors, BLER) to determine whether to update the E2E ML configuration. For example, the E2E ML controller 318 determines modifications (e.g., parameter changes) to an existing DNN to better accommodate the performance requirements of devices, applications, and/or transmissions in a wireless network. A UE changing location may impact on the wireless link performance, or a user opening an application at the UE may reduce the processing capability the user equipment can provide for machine learning. By reassessing dynamically changing conditions (e.g., changes in the operating environment, changes in the devices), the E2E ML controller can modify or update the E2E ML configuration to improve an overall efficiency of how the wireless network resources are utilized.

Having described E2E ML for wireless networks, consider now a discussion of machine-learning architectures for broadcast and multicast communications that are in accordance with one or more implementations.

Machine-Learning Architectures for Broadcast and Multicast Communications

Wireless communications systems use broadcast and multicast communications to propagate information from one device to multiple devices. In propagating the information, the wireless communication system can replicate, copy, or share the same information amongst the multiple devices, such as by transmitting replications of the information on multiple beams or enabling multiple devices to access the information from the same transmission. As one example, a base station transmits information on broadcast channel(s) to provide multiple receiving devices with access to a corresponding network. As another example, the base station can broadcast information associated with a service to multiple devices, such as a traffic broadcast service that delivers traffic updates to multiple vehicles.

Oftentimes, any capable receiving device within working range of a base station has access to the information included in the broadcast communications. However, where broadcast communications disseminate information in a one-to-all manner, multicast communications selectively propagate the information in a one-to-many manner. Instead of providing information to any capable receiving device, multicast communications target specific devices (e.g., a subset of the possible receiving devices).

Transmitting information to multiple devices, whether broadcast or multicast communications, poses several challenges. As one example, transmitting information to multiple devices creates a more complex transmission environment relative to transmitting information to a single device. To illustrate, a mobile device in communication with a base station changes the transmission environment by moving from a first location to a second location. This becomes further compounded when multiple mobile devices receiving broadcast or multicast communications from the base station move in varying directions from one another. As another example, the multiple devices oftentimes have different processing capabilities from one another. For example, a first device receiving the broadcast or multicast communications may have less processing power than a second device receiving the broadcast or multicast communications. The different processing capabilities among different UEs can impact how the base station transmits the information. These differences of device capabilities, as well as changing channel conditions, oftentimes leads to inefficient use of the network resources.

Various implementations utilize machine-learning architectures for broadcast and multicast communications. In implementations, a network entity determines a configuration of a deep neural network (DNN) for processing broadcast or multicast communications transmitted over a wireless communication system, where the communications are directed to a targeted group of user equipments (UEs). The network entity forms a network-entity DNN based on the determined configuration of the DNN and processes the broadcast or multicast communications using the network-entity DNN. In implementations, the network entity forms a common DNN to process and/or propagate the broadcast or multicast communications to the targeted group of UEs.

Figure 11:
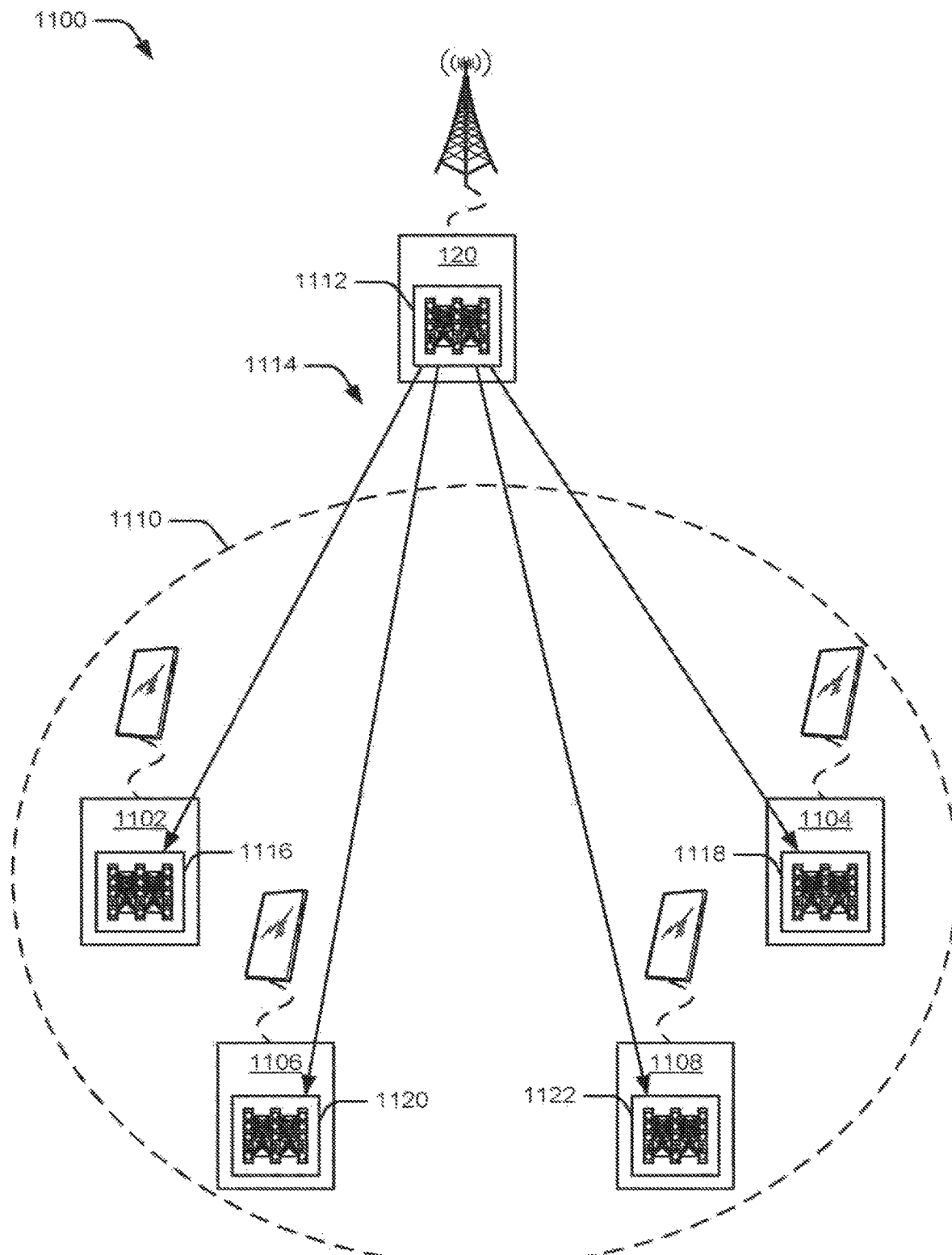
FIG. 11 illustrates an example environment in which various aspects of machine-learning architectures for broadcast and multicast communications can be implemented.

FIG. 11 illustrates an example environment 1100 that utilizes machine-learning architectures for broadcast and multicast communications in accordance with one or more implementations. The environment 1100 includes the base station 120 of FIG. 1, and multiple UEs, labeled UE 1102, UE 1104, UE 1106, and UE 1108, respectively. In various implementations, the UEs 1102, 1104, 1106, and 1108 represent instances of the UE 110 of FIG. 1. Collectively, the UEs 1102, 1104, 1106, and 1108 form a targeted group of UEs 1110 for broadcast communications from the base station 120, where the targeted group includes multiple UEs (e.g., at least two UEs).

The base station 120 includes a base-station side deep neural network 1112 (BS-side DNN 1112) that processes broadcast communications 1114 for transmission over a wireless communication system. For instance, with reference to FIGS. 5 and 6, the BS-side DNN 1112 performs transmitter chain operations to generate and/or propagate the broadcast communications 1114 over a wireless interface to the targeted group of UEs 1110 (e.g., UEs 1102, 1104, 1106, and 1108). Alternately or additionally, with reference to FIG. 10, the BS-side DNN 1112 represents a DNN formed from a portion of a partitioned E2E ML configuration. Similarly, each UE includes a user-equipment side deep neural network (UE-side DNN), labeled as UE-side DNN 1116, UE-side DNN 1118, UE-side DNN 1120, and UE-side DNN 1122, where the UE-side DNNs perform receiver chain operations. In some implementations, the UE-side DNNs represent device-specific DNNs and/or DNNs based on a partitioned E2E ML configuration. In implementations, a neural network manager, an E2E ML controller and/or a network-slice manager determines a configuration for the BS-side DNN 1112 and/or the UE-side DNNs 1116, 1118, 1120, and 1122 as further described.

The BS-side DNN 1112 processes broadcast communications 1114 to transmit information over the wireless communication system, where the processing can include pre-transmission operations. The BS-side DNN 1112 can include any combination of ML-architectures, such as a convolutional neural network (CNN) architecture, a recurrent neural network (RNN) architecture, a LSTM architecture, fully-connected layers architecture, or partially-connected layers architectures. At times, the base station 120 uses a common DNN architecture to form a common DNN (e.g., the BS-side DNN 1112) for communicating with each targeted UE, such as all capable UEs in a cell coverage area associated with the base station 120. Accordingly, each respective UE-side DNN (e.g., UE-side DNNs 1116, 1118, 1120, and 1122) performs complementary processing to the common DNN. In other words, in some implementations, the UE-side DNNs 1116, 1118, 1120, and 1122 receive and process the broadcast communications 1114 using similar DNN architectures. However, in alternate implementations, the UE-side DNNs may receive and process the broadcast communication using different DNN architectures from one another, such as by each respective UE using a respective DNN architecture based upon the respective processing abilities of the UE. In some implementations, a core network server alternately or additionally processes the broadcast communications (not illustrated here) using a core-network-server-side deep neural network (CNS-side DNN), such as that described with reference to FIG. 10.

Figure 12:
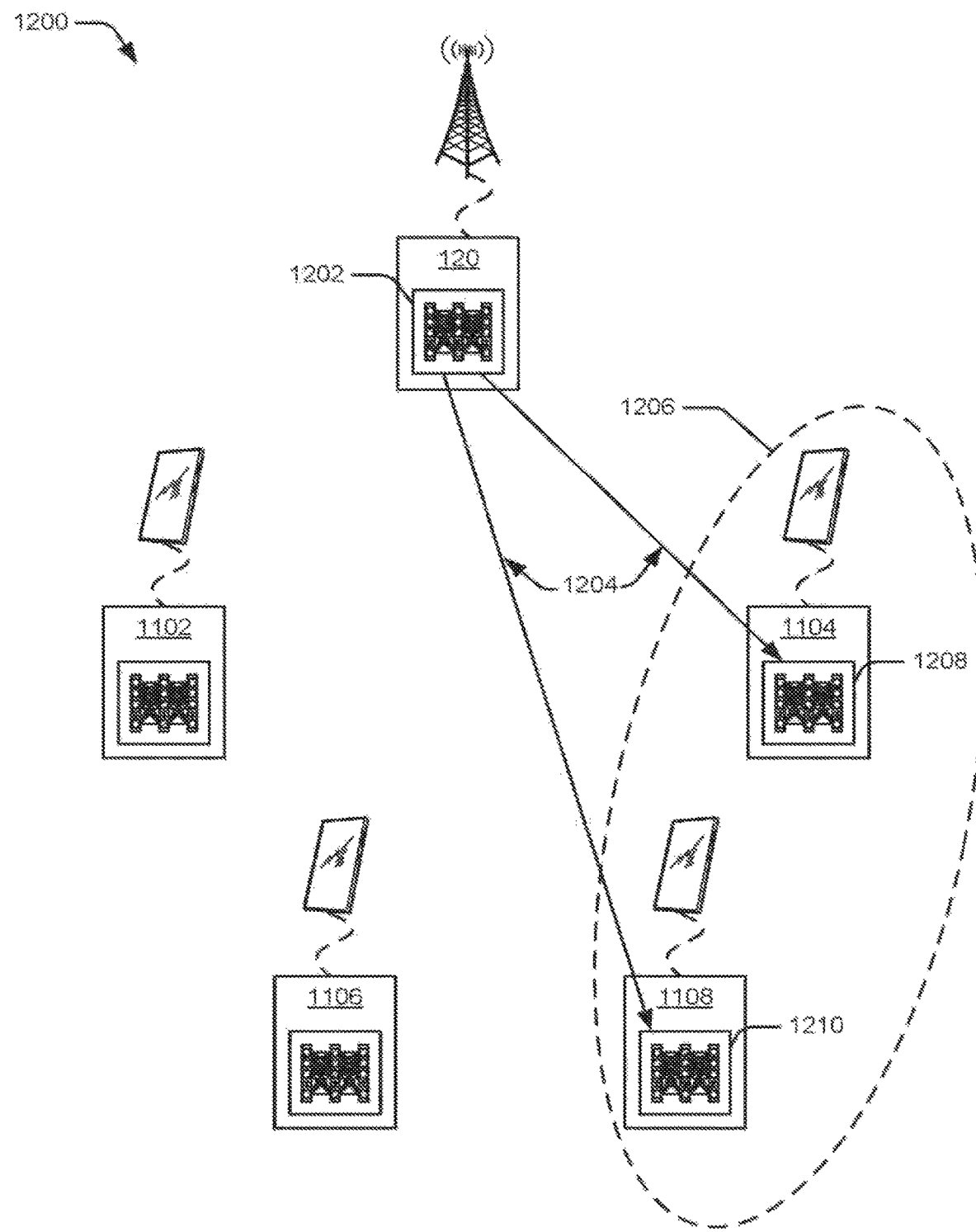
FIG. 12 illustrates an example environment in which various aspects of machine-learning architectures for broadcast and multicast communications can be implemented.

FIG. 12 illustrates an example environment 1200 that utilizes machine-learning architectures for broadcast and multicast communications in accordance with one or more implementations. The environment 1200 includes the base station 120 of FIG. 1, and the UEs 1102, 1104, 1106, and 1108 of FIG. 11 that are all with the base station 120 coverage area. In the environment 1200, the base station 120 includes a base-station side deep neural network 1202 (BS-side DNN 1202) configured to transmit multicast communications 1204 to a targeted group of UEs 1206 that includes two UEs: the UE 1104 and the UE 1108. For instance, with reference to FIGS. 5 and 6, the BS-side DNN 1202 performs transmitter chain operations to process and/or generate the multicast communications 1204. At times, with reference to FIG. 10, the base station 120 forms BS-side DNN 1202 based on a portion of a partitioned E2E ML configuration as further described. In the environment 1200, the targeted group of UEs 1206 corresponds to a subset of UEs that are included in a coverage area associated with the base station 120.

Each UE in the targeted group of UEs 1206 (e.g., UE 1104, UE 1108) includes a respective UE-side DNN that processes and recovers information from the multicast communications 1204. To illustrated, the UE 1104 includes a UE-side DNN 1208 and the UE 1108 includes a UE-side DNN 1210, where the UE-side DNNs perform receiver chain operations and/or complementary operations to the BS-side DNN 1202 to recover the multicast information. In some implementations, the UEs 1104 and 1108 form the UE-side DNNs 1208 and 1210 based on a portion of a partitioned E2E ML configuration, such as the partitioned E2DE ML configuration used to form the BS-side DNN 1202. While not illustrated in FIG. 12, some implementations include a CNS-side DNN at a core network server to process the multicast communications as further described with reference to FIG. 10.

By using DNNs to process broadcast and/or multicast communications, a wireless communication system can adapt the processing to improve the communication exchanges in the system. As one example, the wireless communication system configures the DNNs (e.g., the BS-side DNN, the UE-side DNNs, a CNS-side DNN) based on a current operating condition or diverse UE capabilities to improve an overall performance of the broadcast and/or multicast communications exchanged between the devices (e.g., lower bit errors, improved signal quality, improved latency). Alternately or additionally, the wireless communication system configures the DNNs based on a lowest-common configuration that each UE in a targeted group of UEs supports (e.g., using a configuration that a UE with the lowest processing power can support).

In implementations, a network entity (e.g., the core network server 302, the base station 120) uses any combination of a neural network manager, an E2E ML controller, and/or a network slicer, to determine one or more ML configuration(s) that process broadcast or multicast communications. The ML configuration(s) can be based on content requirements of the broadcast and/or multicast communications, a current operating environment, changes in the current operating environment, UE capabilities, UE characteristics, etc. For instance, the content requirements specify a quality requirement, a resolution requirement, or a frames-per-second requirement for a particular UE in a targeted group of UEs receiving the broadcast and/or multicast communications. Alternately or additionally, the content requirements specify a quality requirement, a resolution requirement, or a frames-per-second requirement for each UE in the targeted group of UEs. The network entity analyzes these content requirements and determines device-specific ML configuration(s) or an E2E ML configuration designed to fulfill the content requirements for each UE and/or the particular UE, such as described with reference to FIG. 10. At times, the network entity determines to change the ML configuration when the content requirements of the broadcast or multicast communication requirements change. Alternately or additionally, the network entity determines the ML configuration(s) based on a network slice designed to meet performance and/or content requirements. In some implementations, the network entity, determines an ML configuration for each of the devices based on UE characteristics, such as an estimated location of each device, capabilities of each device, UE velocity, and so forth.

Signaling and Control Transactions to Configure Deep Neural Networks

FIGS. 13, 14, 15, and 16 illustrate example signaling and control transaction diagrams between a base station, a user equipment, and/or a core network server in accordance with one or more aspects of using machine-learning architectures for broadcast and multicast communications in wireless communications. The signaling and control transactions may be performed by the base station 120 and the UE 110 of FIG. 1, or the core network server 302 of FIG. 3, using elements of FIGS. 1-12.

Figure 13:
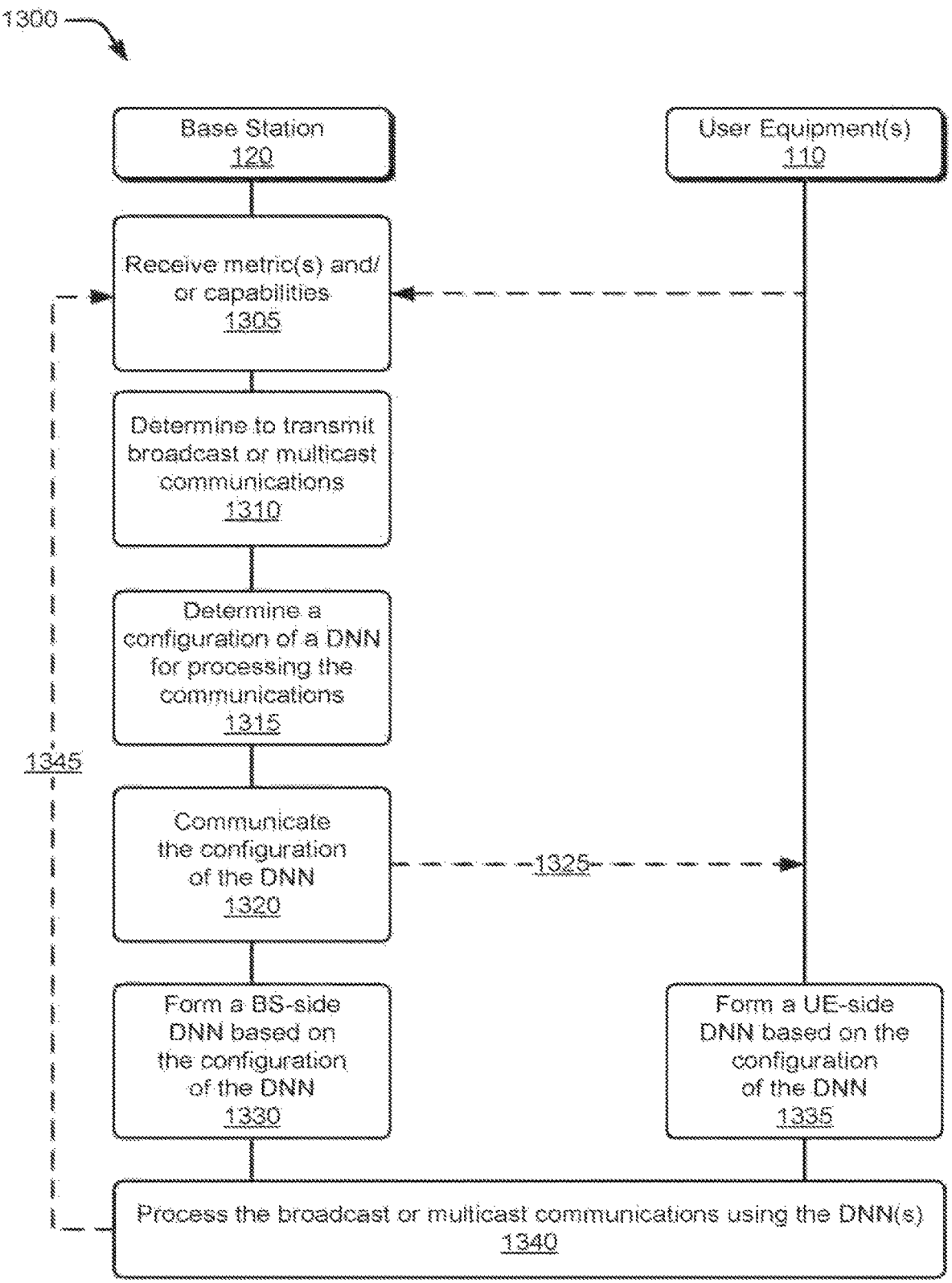
FIG. 13 illustrates an example transaction diagram between various devices in accordance with various implementations of machine-learning architectures for broadcast and multicast communications.

A first example of signaling and control transactions of using machine-learning architectures for broadcast and multicast communications in wireless communications is illustrated by the signaling and control transaction diagram 1300 of FIG. 13. At 1305, the base station 120 optionally receives metrics and/or UE capabilities from the UE(s) 110, where the UE(s) in FIG. 13 correspond to a targeted group of UEs, such as the targeted group of UEs 1110 as illustrated in FIG. 11 or the targeted group of UEs 1206 as illustrated in FIG. 12. For instance, the base station 120 receives UE capabilities from one or more UEs in the targeted group of UEs in response to sending a request for UE capabilities. In some implementations, the UE capabilities include ML-related capabilities, such as a maximum kernel size capability, a memory limitation, a computation capability, supported ML architectures, supported number of layers, available processing power, memory limitation, available power budget, and fixed-point processing versus floating point processing. As another example, the base station 120 receives UE metrics from one or more UE of the UE(s) 110, such as power measurements (e.g., RSS), error metrics, timing metrics, QoS, latency, a Reference Signal Receive Power (RSRP), SINR information, CQI, CSI, Doppler feedback, QoS, latency, etc. Alternately or additionally, the base station 120 generates BS metrics based on communications with the UE(s), such as those described with reference to FIG. 8.

At 1310, the base station 120 determines to transmit broadcast or multicast communications. For instance, the base station 120 determines to transmit machine-type communications (MTC) to a subset of IoT devices using multicast communications. As another example, the base station 120 determines to transmit a paging message to all devices in a cell coverage area using broadcast communications.

In response to determining to transmit the broadcast or multicast communications, the base station 120 (by way of the BS neural network manager 268, an E2E ML controller implemented by the base station, and/or a network-slice manager implemented by the base station) determines a configuration of a DNN for processing the communications at 1315. The configuration of the DNN can include a (partitioned) E2E ML configuration and/or multiple DNN configurations for multiple devices. In some implementations, the base station neural network manager 268 determines to use a default configuration for the DNN. As another example, the base station neural network manager 268 determines the configuration by communicating with an E2E ML controller and/or a network-slice manager, such as the E2E ML controller 318 and/or the network-slice manager 320 at the core network server 302 or an E2E ML controller and/or network-slice manager implemented at the base station 120. To illustrate, the base station neural network manager 268 communicates content and/or performance requirements to the E2E ML controller and/or a network-slice manager, such as quality requirements, resolution requirements, frames per second requirements, latency requirements, or bandwidth requirements, to determine a configuration for the DNN directed to meet the requirements.

In some implementations, the base station 120 determines DNN configuration(s) based on one or more (estimated) locations of UEs, such as estimated locations of each UE in a targeted group of UEs, a single estimated location of a single UE in the targeted group of UEs, or the respective estimated locations of a subset of UEs in the targeted group of UEs. The targeted group of UEs can include all UEs within a cell coverage area or a subset of UEs within the cell coverage area, where, in various implementations, a targeted group of UEs includes at least two UEs. For example, in response to identifying that at least one UE of the targeted UEs is located at an edge of the cell coverage area, the base station 120, by way of the any combination of the base station neural network manager 268, a network-slice manager and/or an E2E ML controller, determines DNN configuration(s) to reliably transmit the broadcast or multicast communications to the UE located at the edge of the cell coverage, in addition to the other UEs in the targeted group of UEs. In some implementations, this includes analyzing a neural network table based upon the estimated location(s), UE capabilities, wireless network resource partitioning, operating parameters, the metrics received at 1305, a current operating environment, UE ML capabilities, and so forth, to determine the configuration of the DNN.

In determining the configuration of the DNN, the base station 120 sometimes determines gradient or scaled versions of the configuration and/or ML architecture. Consider, for example, a scenario in which a first UE in the targeted group of UEs has less processing power relative to a second UE in the targeted group of UEs. Some implementations identify simplified versions of the determined configuration and communicate the simplified version to the first UE with less processing power. A simplified version of the determined configuration denotes a scaled version of the ML configuration with less complexity relative to the determined configuration, such as a reduced number of layer connections, less processing points, etc. More broadly, gradient versions of an ML or DNN configuration are variations of an architecture or configuration that perform different levels of processing, such as by variations with different layer connections to reduce or increase the number of processing nodes, different filtering to reduce or increase a number of data points processed, and so forth. Accordingly, in determining the configuration of the DNN, the base station 120 can determine gradient or scaled versions of the configuration based upon UE capabilities.

At 1320, the base station 120 optionally communicates the configuration of the DNN to the UE(s) 110 at 1325. As one example, when the base station determines to use a default DNN configuration, the UE 110 implicitly determines to use a default DNN configuration in response to not receiving a DNN configuration from the base station. Thus, the base station does not communicate the DNN configuration explicitly. As another example, the base station 120 communicates a partition of an E2E ML configuration or a UE-specific DNN configuration to the UE 110. The configuration of the DNN can be included in any suitable manner, such as through the use of a broadcast or unicast message.

At 1330, the base station 120 forms a DNN based on the configuration of the DNN determined at 1315. In implementations, the DNN formed by the base station (e.g., B S-side DNNs 1112) performs at least some processing for transmitting broadcast or multicast communications over a wireless communication system. Similarly, at 1335, the UE 110 forms a DNN based on the configuration determined at 1315. For instance, the UE 110 accesses a neural network table to obtain one or more parameters and uses the parameters to form the DNN as described with reference to FIG. 8. In implementations, the UE forms the DNN using a default neural network formation configuration, a portion of an E2E ML configuration, or a UE-specific neural network formation configuration, where the DNN formed by the UE 110 (e.g., UE-side DNNs 1116, 1118, 1120, and 1122) performs at least some processing related to consuming the broadcast or multicast communications.

Afterwards, at 1340, the base station 120 and the UE 110 process broadcast or multicast communications using the DNNs, such as that described with reference to FIGS. 11 and 12. In implementations, the base station 120 and/or the UE 110 iteratively perform the signaling and control transactions described in the signaling and control transaction diagram 1300, signified by dashed line 1345. These iterations allow the base station 120 and/or the UE 110 to dynamically modify the DNNs processing the broadcast or multicast communications based upon changing operating conditions as further described.

Figure 14:
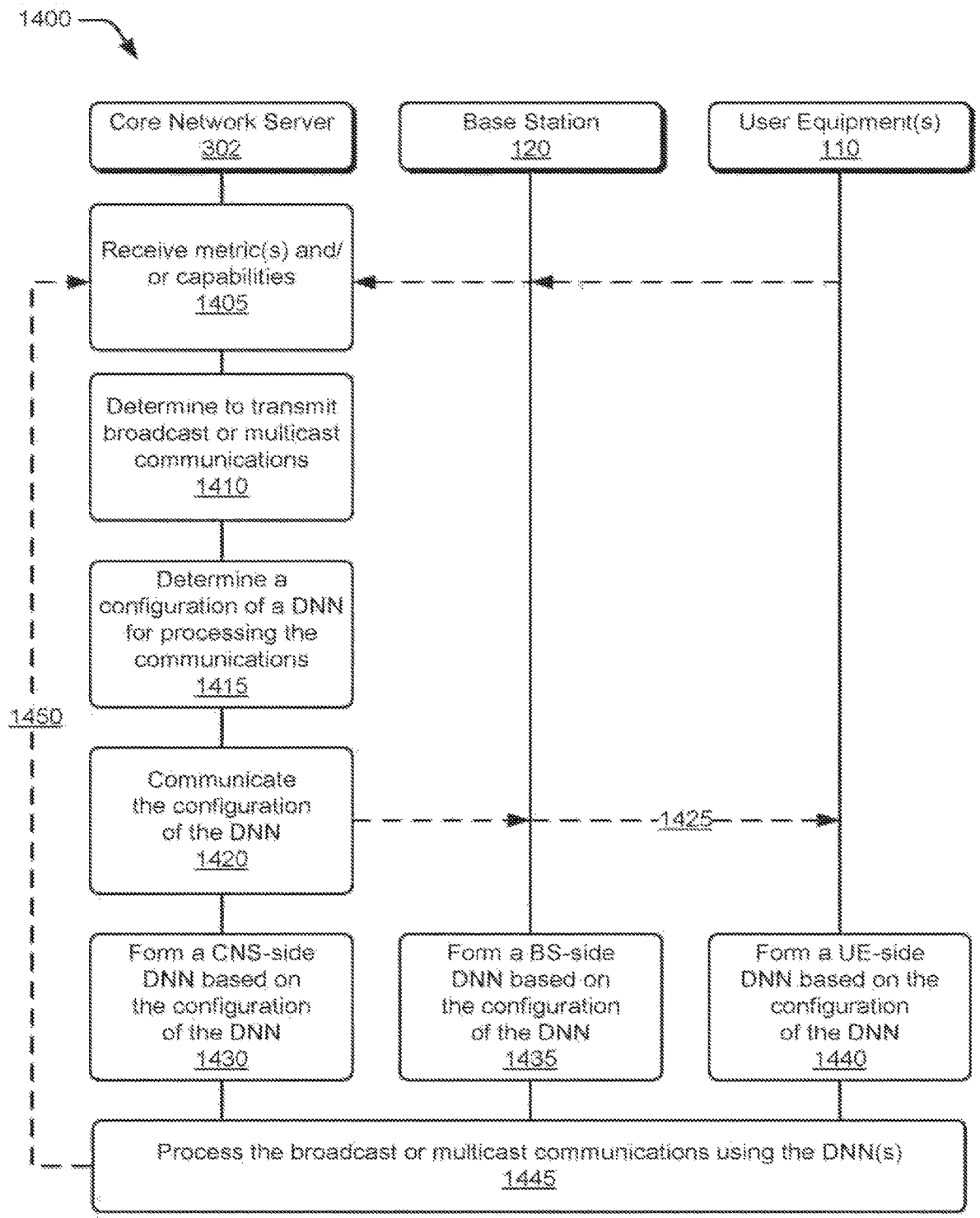
FIG. 14 illustrates an example transaction diagram between various devices in accordance with various implementations of machine-learning architectures for broadcast and multicast communications.

A second example of signaling and control transactions of using machine-learning architectures for broadcast and multicast communications in wireless communications is illustrated by the signaling and control transaction diagram 1400 of FIG. 14. The example diagram 1400 performs similar transactions to those described with respect to 1300, where the signaling and control transactions include interactions with the core network server 302.

At 1405, the core network server 302 optionally receives metrics and/or capabilities from base station 120 and/or the UE(s) 110 (by way of the base station 120), where the UE(s) in FIG. 14 correspond to a targeted group of UEs, such as the targeted group of UEs 1110 as illustrated in FIG. 11 or the targeted group of UEs 1206 as illustrated in FIG. 12. In implementations, the core network server 302 receives UE capabilities or UE metrics from one or more UEs in the targeted group of UEs through the base station 120, such as ML-related capabilities or processing capabilities. Alternately or additionally, the core network server 302 receives BS metrics from the base station 120 that are based on communications that the base station exchanges with the UE(s) as described with reference to FIG. 8. Alternately or additionally, the core network server 302 receives BS capabilities from the base station 120, such as processing power, power state, capacity (e.g., supportable number of connections), working range, and so forth.

At 1410, the core network server 302 determines to transmit broadcast or multicast communications and determines a configuration of a DNN for processing the communications at 1415. In implementations, the core network neural network manager 312 determines the configuration by communicating with the E2E ML controller 318 and/or the network-slice manager 320. The configuration can, at times, be based on any combination of content requirements, performance requirements, UE capabilities, UE characteristics, or a current operating condition.

In some implementations, the core network server 302 determines the configuration of the DNN based on one or more (estimated) locations of UEs, such as estimated locations of a targeted group of UEs that include all UEs within a cell coverage area or a subset of UEs within the cell coverage area. To illustrate, the core network server 302 analyzes a neural network table based upon any combination of the estimated location(s), to determine the configuration. Alternately or additionally, the core network server 302 analyzes the neural network table based on UE capabilities, wireless network resource partitioning, content requirements, performance requirements, the metrics received at 1305, a current operating environment, UE ML capabilities, one or more UE velocities, and so forth, to determine the configuration of the DNN. Any type of configuration can be determined for the DNN, such as a CNS-specific DNN configuration, a BS-side DNN configuration, s UE-side DNN configurations, and/or partitioned E2E ML configurations as further described.

In determining the configuration of the DNN, the core network server 302 sometimes determines simplified versions of the configuration and/or ML architecture, where a simplified version of the determined configuration denotes a scaled version of the ML configuration that has less or more processing complexity relative to the determined configuration, such as a reduced number of layer connections, less processing points, etc. Thus, as part of determining the configuration of the DNN, the core network server 302 sometimes determines gradient or scaled versions of the configuration based upon UE capabilities.

At 1420, the core network server optionally communicates the configuration of the DNN to the base station 120 and/or the UE(s) 110 at 1425. As one example, when the core network server 302 to use a default DNN configuration, the base station 120 and/or the UE 110 implicitly determine to use a default DNN configuration in response to not receiving a DNN configuration from the core network server 302. As another example, the core network server 302 communicates partitions of an E2E ML configuration or device-specific DNN configurations to the base station 120 and/or the UE(s) 110.

At 1430, the core network server forms a core-network-server-side deep neural network (CNS-side DNN) based on the configuration of the DNN determined at 1415. In implementations, the DNN formed by the core network server performs at least some processing for transmitting broadcast or multicast communications over a wireless communication system, which can include pre-transmission processing. At 1335, the base station 120 forms a DNN based on the configuration of the DNN determined at 1415. In implementations, the DNN formed by the base station performs at least some processing for transmitting broadcast or multicast communications over a wireless communication system, including pre-transmission processing. Similarly, at 1440, the UE 110 forms a DNN based on the configuration determined at 1415. For instance, the UE 110 accesses a neural network table using information received at 1425 to obtain one or more parameters as described with reference to FIG. 8. This can include forming a DNN using a default neural network formation configuration, a portion of an E2E ML configuration, or a UE-specific neural network formation configuration. In implementations, the DNN formed by the UE 110 performs at least some processing for transmitting broadcast or multicast communications over a wireless communication system.

Afterwards, at 1445, the core network server 302, the base station 120 and the UE(s) 110 process broadcast or multicast communications using the DNNs, such as that described with reference to FIGS. 11 and 12. In implementations, the core network server 302, the base station 120 and/or the UE 110 iteratively perform the signaling and control transactions described in the signaling and control transaction diagram 1400, signified with dashed line 1450. These iterations allow the core network server 302, the base station 120 and/or the UE 110 to dynamically modify the DNNs processing the broadcast or multicast communications based upon changing operating conditions as further described.

Changing operating conditions impact the performance of how well each DNN processes information. To illustrate, and with reference to FIG. 8, the training module 270 and/or the training module 314 generate neural network formation configurations based on operating conditions as described by the input characteristics. This includes operating conditions corresponding to broadcast and multicast communications, such as operating conditions that include estimated UE locations, number of targeted UEs, channel conditions, content requirements, or network slice configurations. As current operating conditions deviate from the operating conditions used to train a DNN, the performance of the DNN begins to deteriorate.

Various implementations measure a performance of DNN(s) used to exchange broadcast or multicast communications and determine to make modifications to the DNNs when the performance fails to meet a threshold value. This includes determining to make architectural changes and/or parameter changes to the DNN(s), such as by determining new neural network formation configurations that correspond to the changes. The modifications to the DNN(s) can include small changes that involve updating coefficient parameters of an existing architecture configuration, or larger changes that involve modifying an architecture configuration. A cost function, for example, measures a performance of error within a system, such as through a comparison of a predicted value generated by a DNN and an expected or true value. When the cost function indicates that the performance of error within the system meets a desired threshold, various implementations determine to make small modifications to the system (e.g., parameter changes). When the cost function indicates that the performance of error within the system fails to meet a desired threshold, various implementations determine to make large modifications to the system (e.g., architecture configuration changes).

Figure 15:
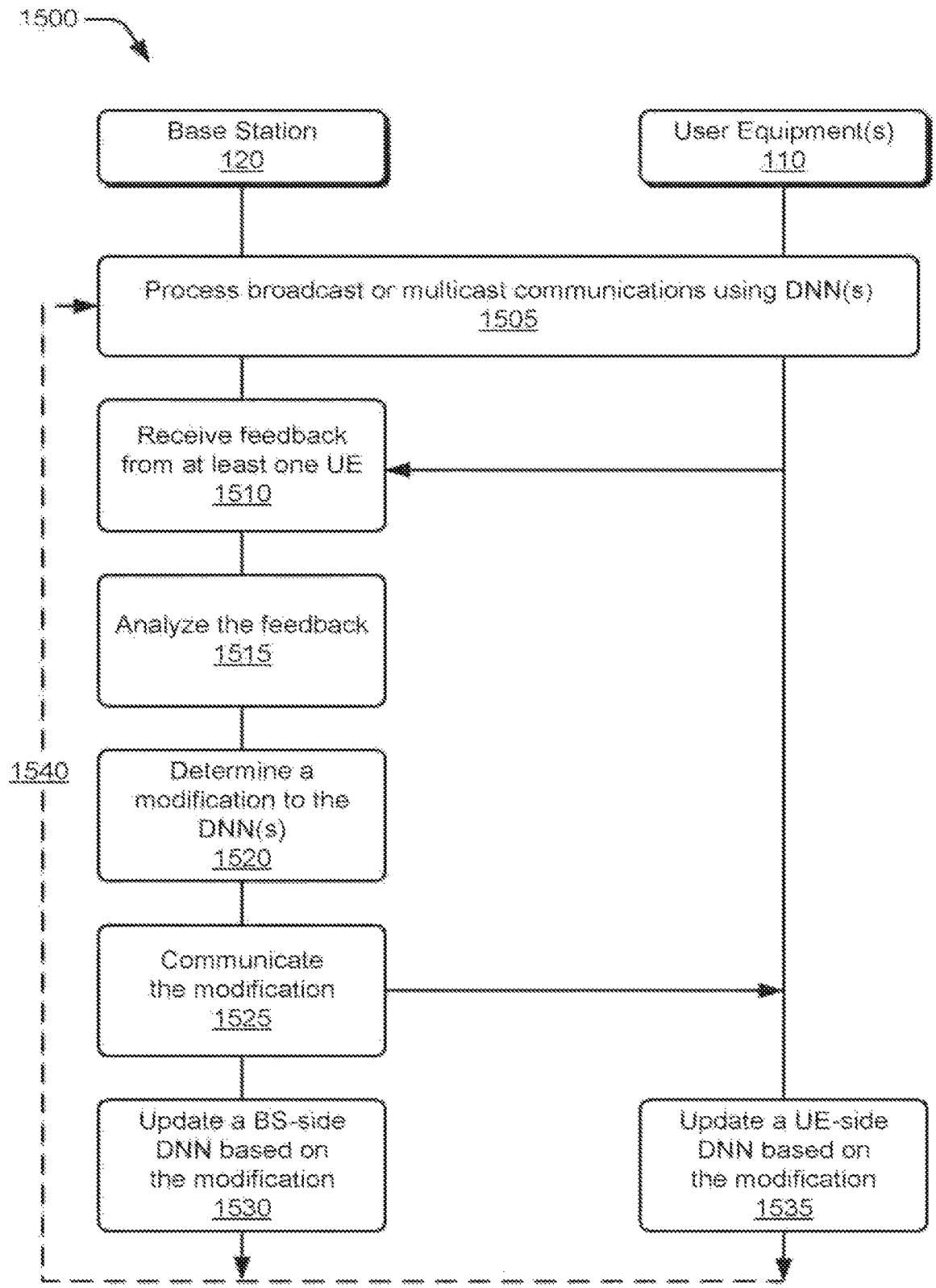
FIG. 15 illustrates an example transaction diagram between various devices in accordance with various implementations of machine-learning architectures for broadcast and multicast communications.

To demonstrate, consider now a third example of signaling and control transactions of using machine-learning architectures for broadcast and multicast communications in wireless communications, illustrated in FIG. 15 by the signaling and control transaction diagram 1500. In some implementations, the signaling and control transaction diagram 1500 represents a continuation of the signaling and control transaction diagram 1300 of FIG. 13.

With reference to FIGS. 11 and 12, the base station 120 and the UE(s) 110 process broadcast or multicast communications using DNN(s) at 1505, where the UE(s) 110 represent a targeted group of UEs that can include all the UEs in a cell coverage area or a subset of UEs in the cell coverage area. In some implementations, the processing performed at 1505 corresponds to the processing performed at 1340 of FIG. 13.

At 1510, the base station 120 receives feedback from at least one UE in the targeted group of UEs. For example, the UE 110 communicates one or more metrics, such as BLER, SINR, CQI feedback, or a packet loss rate. Alternately or additionally, the base station 120 generates one or more metrics, such as a Round-Trip Time (RTT) latency metric.

At 1515, the base station 120 analyzes the feedback. For example, the base station 120 (by way of the BS neural network manager 268, an E2E ML controller implemented by the base station, and/or a network-slice manager implemented by the base station) analyzes the feedback to determine whether each UE in the targeted group of UEs meets a performance threshold value and/or a cost function threshold value. At times, the UEs in the targeted group of UEs have varying performance threshold values and/or cost function threshold values from one another. To illustrate, a first UE in the targeted group may have less processing power relative to a second UE in the targeted group. Thus, different UEs may have different performance requirements based on the relative UE capabilities. Accordingly, the base station 120 compares metrics that describe a performance of a UE-side DNN at the first UE to a different performance threshold value/cost function value than metrics that describe a performance of a UE-side DNN at the second UE. For clarity, the above example discusses analyzing metrics that describe a UE-side DNN performance, but it is to be appreciated that the metrics can describe the performance of DNN chains (e.g., a CNS-side DNN, a BS-side DNN, a UE-side DNN), partitioned DNNs(s) based on an E2E ML configuration, etc.

At 1520, the base station 120 (by way of the BS neural network manager 268, an E2E ML controller implemented by the base station, and/or a network-slice manager implemented by the base station) determines a modification to the DNN(s) based on the feedback. In some implementations, the base station 120 determines a large modification that changes an architecture configuration of the DNNs. For example, in response to determining that "X" number of UEs in the targeted group fail to meet the respective performance and/or cost function threshold value(s), the base station 120 determines a large modification that corresponds to changing an architecture configuration of one or more DNN(s), where "X" represents an arbitrary number. Alternately or additionally, the base station 120 determines a small modification that corresponds to changing parameter configurations without changing the architecture configuration, such as changing coefficient values, weights, or kernel sizes, when more than "X" UEs meet the performance and/or cost function threshold value(s). The modification can correspond to DNNs formed from a partitioned E2E ML configuration and/or can correspond to device-specific DNNs (e.g., a CNS-side DNN, a BS-side DNN, a UE-side DNN). In various implementations, the base station 120 determines gradient modifications based upon respective UE capabilities as further described.

At 1525, the base station 120 communicates the modification to the UE(s) 110. In some implementations, the base station communicates identical modifications to each of the UEs in the targeted group of UEs. In other implementations, the base station communicates gradient modifications to different UEs based upon the respective UE capabilities (e.g., a UE with less processing power receives a simplified version of the modification relative to a UE with more processing power).

At 1530 the base station 120 updates a BS-side DNN based on the modification. Similarly, at 1535, the UE(s) 110, respectively, update a UE-side DNN based on the modification, where the BS-side DNN and the UE-side DNNs can correspond to device-specific DNNs or DNNs based on a partitioned E2E ML configuration. In implementations, the base station 120 and/or the UE(s) 110 iteratively perform the signaling and control transactions described in the signaling and control transaction diagram 1500, signified with dashed line 1540. These iterations allow the base station 120 and/or the UE(s) 110 to dynamically modify the DNNs processing the broadcast or multicast communications based upon changing operating conditions as further described.

Figure 16:
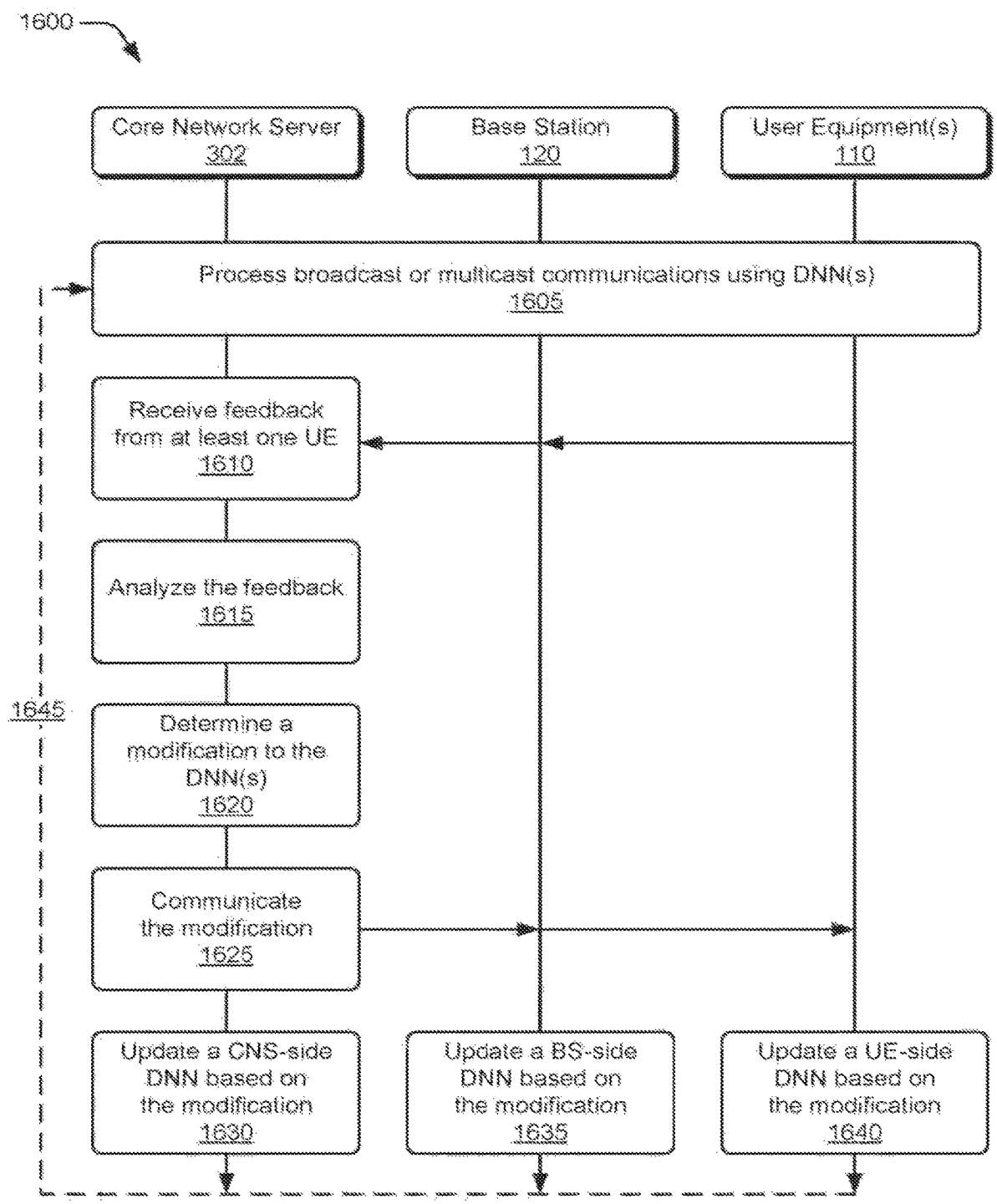
FIG. 16 illustrates an example transaction diagram between various devices in accordance with various implementations of machine-learning architectures for broadcast and multicast communications.

A fourth example of signaling and control transactions of using machine-learning architectures for broadcast and multicast communications in wireless communications is illustrated by the signaling and control transaction diagram 1600 of FIG. 16. The example diagram 1600 performs similar transactions to those described with respect to 1500, where the transactions include interactions with the core network server 302. In some implementations, the signaling and control transaction diagram 1600 represents a continuation of the signaling and control transaction diagram 1400 of FIG. 14.

At 1605, the core network server 302, base station 120 and the UE(s) 110 process broadcast or multicast communications using DNN(s), where the UE(s) 110 represent a targeted group of UEs that can include all the UEs in a cell coverage area or a subset of UEs in the cell coverage area. In some implementations, the processing performed at 1605 corresponds to the processing performed at 1445 of FIG. 14.

At 1610, the core network server 302 receives feedback from at least one UE in the targeted group of UEs, by way of the base station 120. For example, the UE 110 communicates one or more metrics, such as BLER, SINR, CQI feedback, or a packet loss rate, as feedback to the core network server 302. Alternately or additionally, the base station 120 generates one or more metrics, such as a Round-Trip Time (RTT) latency metric, and sends the metrics as feedback to the core network server 302.

At 1615, the core network server 302 analyzes the feedback. For example, the core network server 302 (by way of the core network neural network manager 312, the E2E ML controller 318, and/or the network-slice manager 320) analyzes the feedback to determine whether each UE in the targeted group of UEs meets a performance threshold value and/or a cost function threshold value. In some implementations, the core network server 302 uses a same performance threshold value and/or cost function value when analyzing the performance of each UE in the targeted group of UEs. Other times, the core network server 302 uses varying performance and/or cost function threshold values based on the relative UE capabilities of each UE. Accordingly, the core network server 302 compares metrics that describe a performance of a UE-side DNN at the first UE to a different performance threshold value/cost function value than metrics that describe a performance of a UE-side DNN at the second UE. For clarity, the above example discusses analyzing metrics that describe a UE-side DNN performance, but it is to be appreciated that the metrics can describe the performance of DNN chains (e.g., a CNS-side DNN, a BS-side DNN, a UE-side DNN), partitioned DNNs(s) based on an E2E ML configuration, etc.

At 1620, the core network server 302 (by way of the core network neural network manager 312, the E2E ML controller 318, and/or a network-slice manager 320) determines a modification to the DNN(s) based on the feedback. In some implementations, the core network server 302 determines a large modification that changes an architecture configuration of the DNNs. Alternately or additionally, the core network server 302 determines a small modification that changes parameter configurations, such as coefficient values, weights, or kernel sizes. The modification can correspond to DNNs formed from a partitioned E2E ML configuration and/or device-specific DNNs (e.g., a CNS-side DNN, a BS-side DNN, a UE-side DNN). In various implementations, the core network server 302 determines gradient versions of the modifications based upon respective UE capabilities as further described.

At 1625, the core network server 302 communicates the modification to the base station 120 and/or the UE(s) 110 (by way of the base station 120). In some implementations, the core network server 302 communicates identical modifications to each of the UEs in the targeted group of UEs. In other implementations, the core network server 302 communicates gradient modifications to different UEs based upon the respective UE capabilities (e.g., a UE with less processing power receives a simplified version of the modification relative to a UE with more processing power).

At 1630, the core network server updates a CNS-side DNN based on the modification. Similarly, at 1635 and 1640, respectively, the base station 120 updates a BS-side DNN based on the modification and the UE(s) 110 update respective UE-side DNNs based on the modification. The CNS-side DNN, the BS-side DNN, and/or the UE-side DNNs can correspond to device-specific DNNs or DNNs based on a partitioned E2E ML configuration. In implementations, the core network server 302, the base station 120, and the UE(s) 110 iteratively perform the signaling and control transactions described in the signaling and control transaction diagram 1600, signified with dashed line 1645. These iterations allow the core network server 302, the base station 120 and/or the UE(s) 110 to dynamically modify the DNNs processing the broadcast or multicast communications based upon changing operating conditions as further described.

Example Methods

Example methods 1700 and 1800 are described with reference to FIG. 17 and FIG. 18 in accordance with one or more aspects of machine-learning architectures for broadcast and multicast communications. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like.

Figure 17:
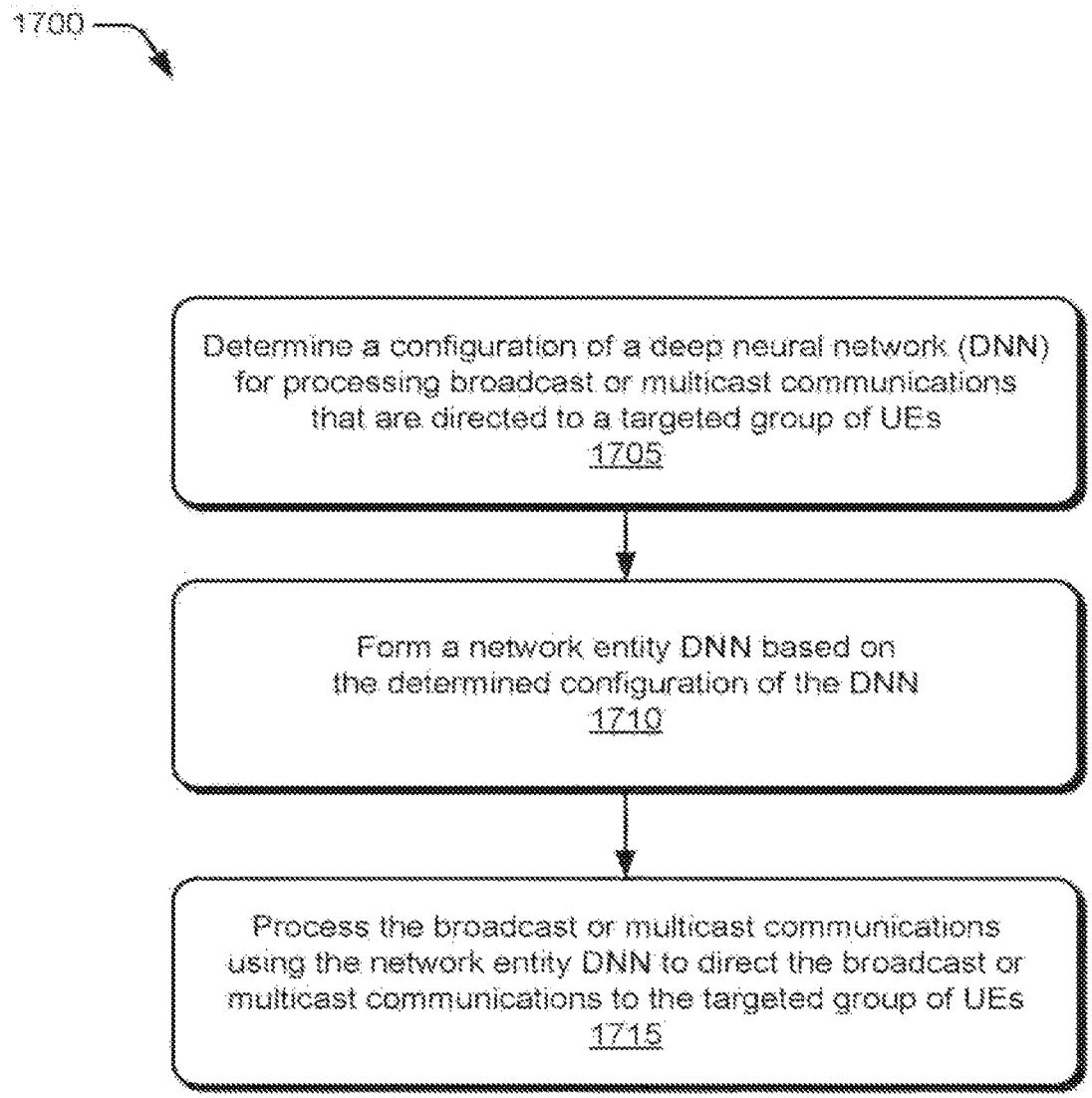
FIG. 17 illustrates an example method for using machine-learning architectures for broadcast and multicast communications.

FIG. 17 illustrates an example method 1700 for using a machine-learning architecture for processing broadcast or multicast communications. In some implementations, operations of method 1700 are performed by a network entity, such as any one of the base stations 120 or the core network server 302.

At 1705, the network entity determines a configuration of a deep neural network (DNN) for processing broadcast or multicast communications that are directed to a targeted group of UEs using a wireless communication system, such as that described at 1315 of FIG. 13 or 1415 of FIG. 14. In one or more implementations, the network entity (e.g., core network server 302) determines an E2E ML configuration for transmitting the broadcast or multicast communications to the targeted group of UEs (e.g., targeted group of UEs 1110, targeted group of UEs 1206). As another example, the network entity (e.g., base station 120) determines the configuration of one or more DNNs (e.g., at 710, at 915), such as a first configuration for a BS-side DNN and a second configuration for a UE-side DNN that performs complementary operations to one another. The targeted group of UEs can include all of the UEs in a cell coverage area associated with the network entity or a subset of UEs in the cell coverage area.

In some implementations, the network entity determines to use a default configuration. In other implementations, the network entity determines the configuration based on one or more metrics (e.g., at 1305, at 1315, at 1405, at 1415). At times, the network entity determines gradient versions of the DNN configuration based on UE capabilities of one or more UEs in the targeted group of UEs. Alternately or additionally, the network entity determines the configuration for the DNN based on one or more characteristics associated with the targeted group of UEs, such as characteristics that describe a current operating environment, an estimated location of each UE in the targeted group of UEs (e.g., at least two estimated locations), UE ML capabilities, etc. In some implementations, the network entity determines the configuration of the DNN based on one or more content requirements of the broadcast or multicast communications (e.g., a quality requirement, a resolution requirement, a frames per second requirement).

At 1710, the network entity forms a network-entity DNN based on the determined configuration of the DNN, such as that described at 1330 of FIG. 13 or 1430 of FIG. 14. In implementations, the network entity (core network server 302) forms a CNS-side DNN, where the CNS-side DNN can be based on a partition of an E2E ML configuration or a device-specific DNN configuration. As another example, the network entity (e.g., base station 120) forms the BS-side DNN 1202. In implementations, the network entity accesses a neural network table to obtain one or more architecture and/or parameter configurations. In response to obtaining the configurations, the network entity forms the network-entity DNN using the architecture and/or parameter configurations. In some implementations, the network entity optionally communicates the configuration of the DNN to the targeted group of UEs, such as that described at 1325 of FIG. 13 and at 1425 of FIG. 14. Alternately or additionally, the network entity implicitly indicates, to the targeted group of UEs, to use a default configuration for the DNN, such as by not communicating a configuration to the targeted group of UEs.

At 1715, the network entity processes the broadcast or multicast communications using the network-entity DNN to direct the broadcast or multicast communications to the targeted group of UEs using the wireless communication system. For example, a CNS-side DNN (1012, 1014) at the core network server 302 processes pre-transmission communications, such as that described with reference to FIG. 6. As another example, a BS-side DNN (1112, 1202) at the base station 120 processes the broadcast or multicast communications, including pre-transmission communications, to transmit the broadcast or multicast communications to the targeted group of UEs. In some implementations, the BS-side DNN corresponds to a common DNN that transmits and directs the broadcast or multicast communications to each UE of the targeted group of UEs using a same configuration rather than UE-specific DNNs.

Figure 18:
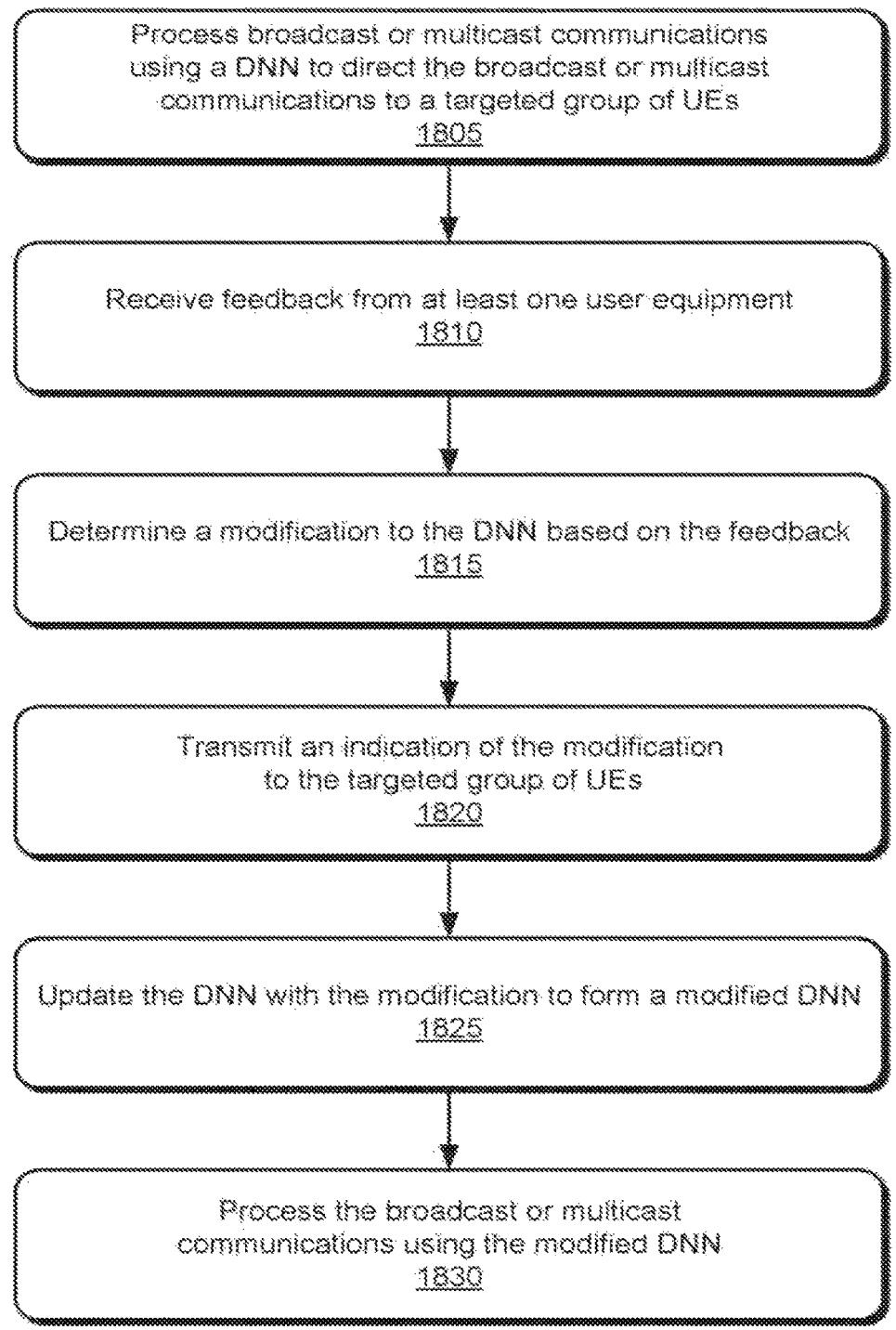
FIG. 18 illustrates an example method for using machine-learning architectures for broadcast and multicast communications.

FIG. 18 illustrates an example method 1800 for using a machine-learning architecture for processing broadcast or multicast communications. In some implementations, operations of method 1800 are performed by a network entity, such as any one of the base stations 120 or the core network server 302.

At 1805, the network entity processes broadcast or multicast communications using a deep neural network (DNN) to direct the broadcast or multicast communications to a targeted group of user equipments (UEs) using a wireless communication network. For example, the network entity (e.g. core network server 302, base station 120) processes the broadcast or multicast communications as described at 1340 of FIG. 13, at 1445 of FIG. 14, at 1505 of FIG. 15, and at 1605 of FIG. 16. This can include processing the broadcast or multicast communications using a DNN formed using a partition of an E2E ML configuration or a device-specific DNN. In some implementations, the DNN performs transmitter chain operations, including pre-transmission processing, to direct transmissions to the targeted group of UEs.

At 1810, the network entity receives feedback from at least one user equipment of the targeted group of UEs. For example, the network entity (e.g. core network server 302, base station 120) receives one or more metrics from a UE in the targeted group of UEs as described at 1510 and at 1610 of FIGS. 15 and 16. In implementations, the metrics characterize a performance of one or more processing chains, such as power measurements (e.g., RSS), error metrics, timing metrics, QoS, latency, a Reference Signal Receive Power (RSRP), SINR information, CQI, CSI, error metrics, or Doppler feedback. Alternately or additionally, the network entity receives information that characterizes a current operating environment, such as UE capabilities, a base station type (e.g., eNB, gNB, or ng-eNB), or a power mode. In some scenarios, the network entity receives feedback related to the mobility of a UE, such as location change information.

In response to receiving the feedback, the network entity determines a modification to the DNN based on the feedback at 1815. For example, the network entity (e.g. core network server 302, base station 120) analyzes the metrics as described at 1515 of FIG. 15 or at 1615 at FIG. 16 to determine that "X" number of UEs in the targeted group of UEs meet a performance and/or cost function threshold value. This can include the network entity determining a large modification that changes an architecture configuration or a small modification that changes parameter configurations, such as that described at 1520 of FIG. 15 or at 1620 of FIG. 16. As another example, the network entity determines a modification to the DNN based on a location change of a UE.

At 1820, the network entity transmits an indication of the modification to the targeted group of UEs. The core network server 302, for example, transmits the indication to the targeted group of UEs by way of the base station 120. In some implementations, the indication includes an indication of one or more entries in a neural network formation configuration, such as that described at 920 of FIG. 9. At times, the network entity (e.g., the core network server 302, the base station 120) transmits gradient versions of the modification. To illustrate, the network entity transmits a first indication of a first neural network formation configuration to a first UE of the targeted group of UEs and a second indication of a second neural network formation configuration to a second UE, where the first and second neural network formation configurations are based on UE capabilities and form gradient versions of a DNN architecture. For example, a second UE-side DNN formed using the second neural network formation configuration performs less processing relative to a first UE-side DNN formed using the first neural network formation configuration. In other words, the DNN architecture of the second UE-side DNN is a gradient version of the DNN architecture of the first UE-side DNN.

At 1825, the network entity updates the DNN with the modification to form a modified DNN. For example, the core network server 302 updates a CNS-side DNN based on the modification, while the base station 120 updates a BS-side DNN based on the modification. In response to updating the DNN, the network entity processes the broadcast or multicast communications using the modified DNN to direct the broadcast or multicast communications to the targeted group of UEs at 1830.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for machine-learning architectures for broadcast and multicast communications have been described in language specific to features and/or methods, it is to be understood that the subject of the appended claims is not necessarily limited to the specific features or methods described. Rather, the specific features and methods are disclosed as example implementations of machine-learning architectures for broadcast and multicast communications.

In the following, several examples are described.

Example 1: A method performed by a network entity associated with a wireless communication system, the method comprising: determining a configuration of a deep neural network (DNN) for processing broadcast or multicast communications transmitted over the wireless communication system to a targeted group of user equipments (UEs); forming, at the network entity, a network-entity DNN based on the determined configuration of the DNN; and processing the broadcast or multicast communications using the network-entity DNN to direct the broadcast or multicast communications to the targeted group of UEs using the wireless communication system.

Example 2: The method as recited in example 1, wherein the determining the configuration comprises: determining the configuration of the DNN based, at least in part, on at least one characteristic of the targeted group of UEs.

Example 3: The method as recited in example 2, wherein the at least one characteristic comprises at least one of: an estimated location of at least one user equipment (UE) in the targeted group of UEs; or at least one UE capability of the at least one UE in the targeted group of UEs.

Example 4: The method as recited in and one of the examples 1 to 3, wherein the determining the configuration further comprises: determining a gradient version of the configuration for at least one user equipment (UE) in the targeted group of UEs based on processing capabilities of the at least one UE.

Example 5: The method as recited in any one of the examples 1 to 4, wherein processing the broadcast or multicast communications using the network-entity DNN further comprises: processing the broadcast or multicast communications using a common DNN as the network-entity DNN to direct the broadcast or multicast communications to each UE of the targeted group of UEs.

Example 6: The method as recited in any one of the examples 1 to 5, wherein the targeted group of UEs is a subset of UEs in a cell coverage area of a base station in the wireless communication system.

Example 7: The method as recited in any one of the examples 1 to 6, wherein the determining the configuration is based, at least in part, on fulfilling one or more content requirements of the broadcast or multicast communications.

Example 8: The method as recited in example 7, wherein the one or more content requirements comprise at least one of: a quality requirement; a resolution requirement; or a frames-per-second requirement.

Example 9: The method as recited in any one of the examples 1 to 8, wherein the determining the configuration comprises: determining an end-to-end machine-learning configuration as the configuration of the DNN.

Example 10: The method as recited in example 1, wherein the targeted group of UEs includes all UEs in a cell coverage area of a base station of the wireless communication system.

Example 11: A method performed by a network entity associated with a wireless communication system, the method comprising: processing broadcast or multicast communications using a deep neural network (DNN) to direct the one or more broadcast or multicast communications to a targeted group of user equipments (UEs) using the wireless communication system; receiving feedback from at least one user equipment (UE) of the targeted group of UEs; determining a modification to the DNN based on the feedback; transmitting an indication of the modification to the targeted group of UEs; updating the DNN with the modification to form a modified DNN; and processing the broadcast or multicast communications using the modified DNN to direct the broadcast or multicast communications to the targeted group of UEs using the wireless communication system.

Example 12: The method as recited in example 11, wherein the transmitting the indication of the modification further comprises: transmitting a first indication of a first neural network formation configuration to a first UE of the targeted group of UEs, the first neural network formation configuration corresponding to updating parameter configurations of a first respective UE-side DNN; and transmitting a second indication of a second neural network formation configuration to a second UE of the targeted group of UEs, the second neural network formation configuration corresponding to updating parameter configurations of a second respective UE-side DNN, wherein: the first respective UE-side DNN uses a first DNN architecture, the second respective UE-side DNN uses a second DNN architecture, and the second DNN architecture is configured as a gradient version of the first DNN architecture that performs less processing relative to the first DNN architecture.

Example 13: The method as recited in example 12, further comprising: determining the gradient version of the first DNN architecture based, at least in part, on one or more capabilities associated with the second UE.

Example 14: The method as recited in any one of the examples 11 to 13, wherein the transmitting the indication of the modification further comprises: transmitting, to each UE of the targeted group of UEs, a neural network formation configuration that includes an architecture configuration change to each respective UE-side DNN.

Example 15: The method as recited in any one of the examples 11 to 14, wherein the determining the modification to the DNN further comprises: identifying, for each UE in the targeted group of UEs, a respective cost function threshold value; determining, based on the feedback, that at least one UE of the targeted group of UEs fails to meet the respective cost function threshold value; and determining an architecture configuration change as the modification to the DNN.

Example 16: The method as recited in example 15, wherein determining the architecture configuration change further comprises: determining, for at least one UE of the targeted group of UEs, at least one architecture configuration change to a respective UE-side DNN at the at least one UE, and wherein updating the DNN with the modification further comprises: transmitting an indication of the at least one architecture configuration change to at the at least one UE.

Example 17: A network entity apparatus comprising: a wireless transceiver; a processor; and computer-readable storage media comprising instructions that direct the network entity apparatus to perform operations comprising: determining a configuration of a deep neural network (DNN) for processing broadcast or multicast communications transmitted over a wireless communication system and to a targeted group of user equipments (UEs); forming, at the network entity apparatus, a network-entity DNN based on the determined configuration of the DNN; and processing the broadcast or multicast communications using the network-entity DNN to direct the broadcast or multicast communications to the targeted group of UEs using the wireless communication system.

Example 18: The network entity apparatus as recited in example 17, the operations further comprising: receiving feedback from at least one user equipment (UE) of the targeted group of UEs; determining a modification to the DNN based on the feedback; updating the DNN with the modification to form a modified DNN; and processing the broadcast or multicast communications using the modified DNN to direct the broadcast or multicast communications to the targeted group of UEs.

Example 19: The network entity apparatus as recited in example 17 or example 18, wherein the determining the configuration of the DNN further comprises: determining the configuration of the DNN based, at least in part, on transmitting broadcast or multicast communications based on a network slice configuration.

Example 20: The network entity apparatus as recited in any one of the examples 17 to 19, wherein the determining the configuration of the DNN further comprises: determining an end-to-end machine-learning configuration (E2E ML configuration) as the configuration of the DNN, wherein determining the E2E ML configuration comprises determining a partitioning to the E2E ML configuration that distributes the E2E ML configuration across multiple devices.

Example 21: The network entity apparatus as recited in any one of the examples 17 to 20, wherein the determining the configuration of the DNN is based, at least in part, on one or more quality-of-service (QoS) requirements.

What is claimed is:

1. A method performed by a network entity associated with a wireless communication system, the method comprising:
    processing broadcast or multicast communications using a deep neural network (DNN) to direct the one or more broadcast or multicast communications to a targeted group of user equipments (UEs) using the wireless communication system;
    receiving feedback from at least one user equipment (UE) of the targeted group of UEs;
    determining a modification to the DNN based on an architecture configuration change in response to at least one UE of the targeted group of UEs failing to meet a respective cost function threshold value based on the feedback;
    transmitting an indication of the modification to the targeted group of UEs;
    updating the DNN with the modification to form a modified DNN; and
    processing the broadcast or multicast communications using the modified DNN to direct the broadcast or multicast communications to the targeted group of UEs using the wireless communication system.

2. The method as recited in claim 1, wherein the transmitting the indication of the modification further comprises:
    transmitting a first indication of a first neural network formation configuration to a first UE of the targeted group of UEs, the first neural network formation configuration corresponding to updating parameter configurations of a first respective UE-side DNN; and
    transmitting a second indication of a second neural network formation configuration to a second UE of the targeted group of UEs, the second neural network formation configuration corresponding to updating parameter configurations of a second respective UE-side DNN,
    wherein:
        the first respective UE-side DNN uses a first DNN architecture, the second respective UE-side DNN uses a second DNN architecture, and
        the second DNN architecture is configured as a gradient version of the first DNN architecture that performs less processing relative to the first DNN architecture.

3. The method as recited in claim 2, further comprising: determining the gradient version of the first DNN architecture based, at least in part, on one or more capabilities associated with the second UE.

4. The method as recited in claim 1, wherein the transmitting the indication of the modification further comprises:
    transmitting, to each UE of the targeted group of UEs, a neural network formation configuration that includes an architecture configuration change to each respective UE-side DNN.

5. The method as recited in claim 1, wherein the determining the modification to the DNN further comprises:
    identifying, for each UE in the targeted group of UEs, a respective cost function threshold value;
    determining, based on the feedback, that at least one UE of the targeted group of UEs fails to meet the respective cost function threshold value; and
    determining the architecture configuration change as the modification to the DNN.

6. The method as recited in claim 5, wherein determining the architecture configuration change further comprises:

determining, for at least one UE of the targeted group of UEs, at least one architecture configuration change to a respective UE-side DNN at the at least one UE, and
wherein updating the DNN with the modification further comprises:
transmitting an indication of the at least one architecture configuration change to at the at least one UE.

* * * * *